(12) United States Patent
Urabe

(10) Patent No.: US 11,911,816 B2
(45) Date of Patent: Feb. 27, 2024

(54) METHOD FOR IDENTIFYING VARIATION FACTOR PORTION OF SPRINGBACK AMOUNT

(71) Applicant: JFE STEEL CORPORATION, Tokyo (JP)

(72) Inventor: Masaki Urabe, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 393 days.

(21) Appl. No.: 17/422,276

(22) PCT Filed: Oct. 17, 2019

(86) PCT No.: PCT/JP2019/040878
§ 371 (c)(1),
(2) Date: Jul. 12, 2021

(87) PCT Pub. No.: WO2020/158062
PCT Pub. Date: Aug. 6, 2020

(65) Prior Publication Data
US 2022/0088663 A1 Mar. 24, 2022

(30) Foreign Application Priority Data
Feb. 1, 2019 (JP) .................. 2019-016781

(51) Int. Cl.
*B21D 22/02* (2006.01)
*G06F 30/23* (2020.01)
(Continued)

(52) U.S. Cl.
CPC .............. *B21D 22/02* (2013.01); *B21D 22/20* (2013.01); *G06F 30/10* (2020.01); *G06F 30/23* (2020.01)

(58) Field of Classification Search
CPC ........ B21D 22/02; B21D 22/20; B21D 22/24; G06F 30/10; G06F 30/23; G06F 2111/10; G06F 2113/24
See application file for complete search history.

(56) References Cited

U.S. PATENT DOCUMENTS 7,130,714 B1 * 10/2006 Kulkarni ................ B21D 22/10
700/165
10,012,555 B2 * 7/2018 Sumikawa ................ G01L 5/00
(Continued)

FOREIGN PATENT DOCUMENTS

| CN | 101511502 A | 8/2009 |
| CN | 102411641 A | 4/2012 |

(Continued)

OTHER PUBLICATIONS

Hiramoto et al., "Simple Springback Cause Analysis Using Measured Shapes of Dies and Pressed Part", Jun. 2016, Key Engineering Materials, ISSN: 1662-9795, vol. 725, pp. 683-688. (Year: 2016).*

(Continued)

*Primary Examiner* — Mohammad Ali
*Assistant Examiner* — Kelvin Booker
(74) *Attorney, Agent, or Firm* — Oliff PLC

(57) ABSTRACT

A method for identifying a variation factor portion of a springback amount, including: performing press forming analysis under first press forming conditions, and calculating a residual stress distribution in a press formed part; performing springback analysis on the press formed part, and calculating a first springback amount; performing press forming analysis under second press forming conditions, and calculating a residual stress distribution in the press formed part; replacing a value of residual stress in a partial area of the residual stress distribution; performing springback analysis on the press formed part for which the value of the residual stress has been replaced, and calculating a (Continued)

second springback amount; obtaining a difference between the second springback amount and the first springback amount; and identifying a portion in the press formed part that is a factor for variation in springback amount of the press formed part based on the obtained difference.

4 Claims, 22 Drawing Sheets

(51) Int. Cl.
    *G06F 30/10*     (2020.01)
    *B21D 22/20*     (2006.01)

(56) References Cited

U.S. PATENT DOCUMENTS

| | | | | |
|---|---|---|---|---|
| 11,221,272 | B2 * | 1/2022 | Urabe | G06F 30/23 |
| 2008/0092620 | A1 * | 4/2008 | Suzuki | B21D 24/10 |
| | | | | 72/362 |
| 2010/0005845 | A1 | 1/2010 | Yoshida et al. | |
| 2010/0241366 | A1 | 9/2010 | Nonomura et al. | |
| 2014/0172391 | A1 * | 6/2014 | Tokita | G06F 30/23 |
| | | | | 703/2 |
| 2014/0356643 | A1 * | 12/2014 | Nakata | B21D 22/26 |
| | | | | 428/603 |
| 2015/0290694 | A1 * | 10/2015 | Urabe | B21D 19/08 |
| | | | | 72/379.2 |
| 2015/0298193 | A1 * | 10/2015 | Urabe | B21D 22/26 |
| | | | | 72/379.2 |
| 2018/0065164 | A1 * | 3/2018 | Sumikawa | B21D 22/21 |
| 2020/0309635 | A1 * | 10/2020 | Urabe | G01M 5/0041 |
| 2021/0162480 | A1 * | 6/2021 | Urabe | B21D 22/21 |

FOREIGN PATENT DOCUMENTS

| | | | | |
|---|---|---|---|---|
| CN | 107704657 A | | 2/2018 | |
| EP | 2692454 A1 | | 2/2014 | |
| JP | 2007-229724 A | | 9/2007 | |
| JP | 2007229724 A | * | 9/2007 | G06F 17/50 |
| JP | 2008-049389 A | | 3/2008 | |
| JP | 2008-055476 A | | 3/2008 | |
| JP | 2008-087015 A | | 4/2008 | |
| JP | 2008-87024 A | | 4/2008 | |
| JP | 2008-087035 A | | 4/2008 | |
| JP | 4352658 B2 | * | 10/2009 | B21D 22/10 |
| JP | 4894294 B2 | | 3/2012 | |
| JP | 2012-206158 A | | 10/2012 | |
| JP | 2013-043182 A | | 3/2013 | |
| JP | 2013-071120 A | | 4/2013 | |
| JP | 2016198905 A | * | 12/2016 | B29C 43/021 |

OTHER PUBLICATIONS

Li et al., "Simulation of springback", 2002, International Journal of Mechanical Sciences 44 (2002) 103-122. (Year: 2002).*

Nanu et al., "Analytical model for prediction of springback parameters in the case of U stretch-bending process as a function of stresses distribution in the sheet thickness", 2012, International Journal of Mechanical Sciences 64 (2012) 11-21. (Year: 2012).*

Liu et al., "Investigation of the Hot-Stamping Process for Advanced High-Strength Steel Sheet by Numerical Simulation", Aug. 2008, JMEPEG (2010) 19:325-334. (Year: 2008).*

Brabie et al., "Minimization of sheet thickness variation and other defects of mini drawn parts using a blank holder plate made from concentric rings", Jan. 2015, Precision Engineering 42 (2015) 311-320. (Year: 2015).*

Souza et al., "Multivariate modelling of variability in sheet metal forming", Jul. 2007, journal of materials processing technology 203 (2008) 1-12. (Year: 2007).*

Dec. 24, 2019 International Search Report issued in International Patent Application No. PCT/JP2019/040878.

Nov. 2, 2022 Office Action issued in Chinese Patent Application No. 201980090676.5.

Hiramoto et al., "Improvement of Shape Accuracy in Press-Formed Parts of High-Strength Steel by Springback-Root-Cause Analysis.", Key Engineering Materials, (2016), vol. 725, pp. 610-615.

Feb. 23, 2022 Extended European Search Report issued in Patent Application No. 19912654.1.

* cited by examiner

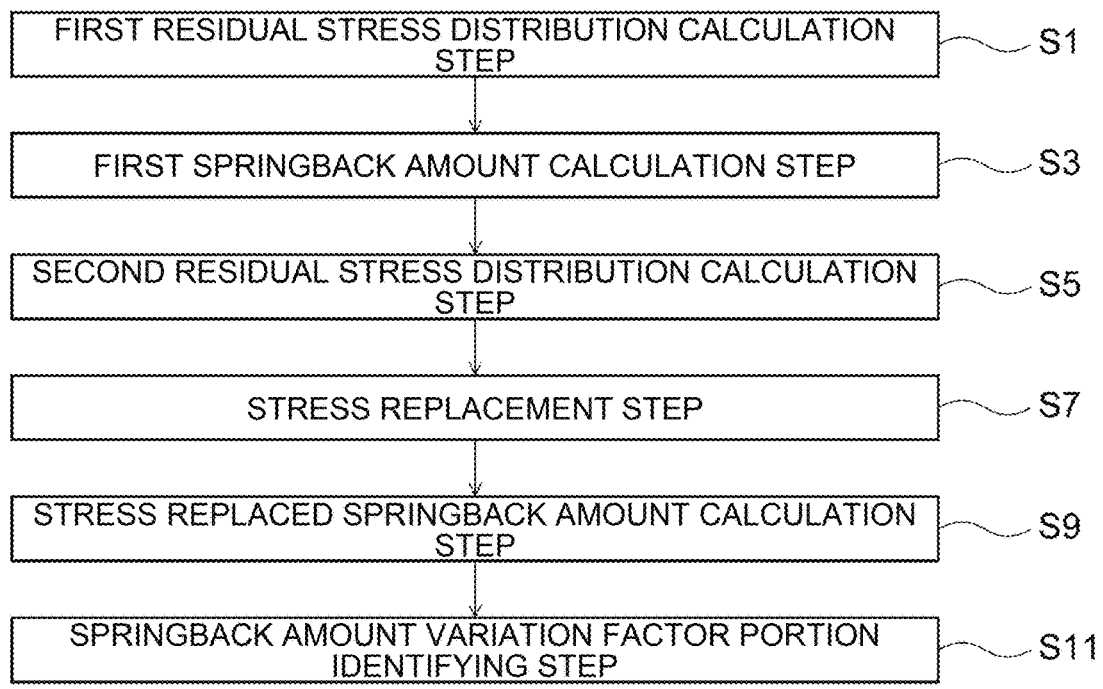
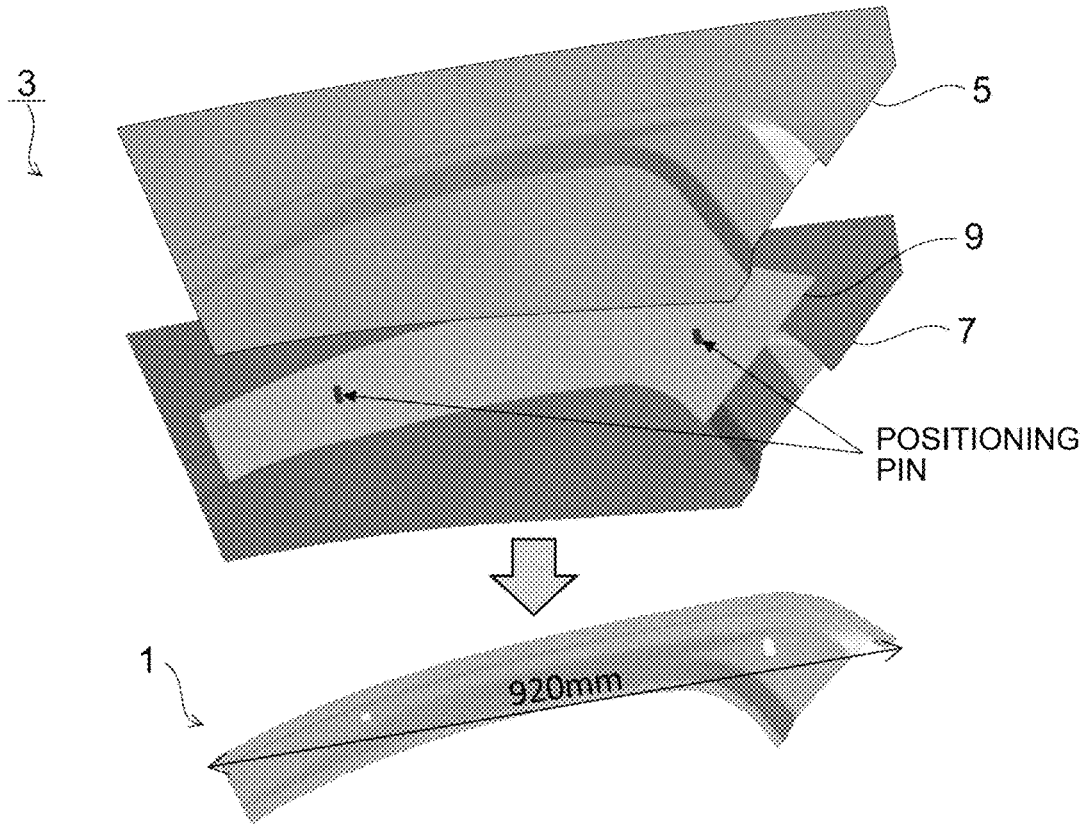

FIG.3
FIRST PRESS FORMING CONDITION [MATERIAL I]
(a)
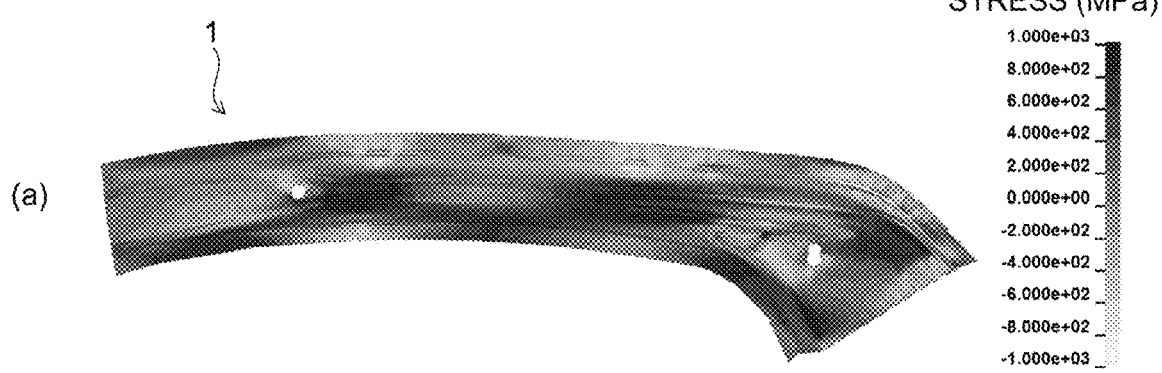
STRESS (MPa)
(b)
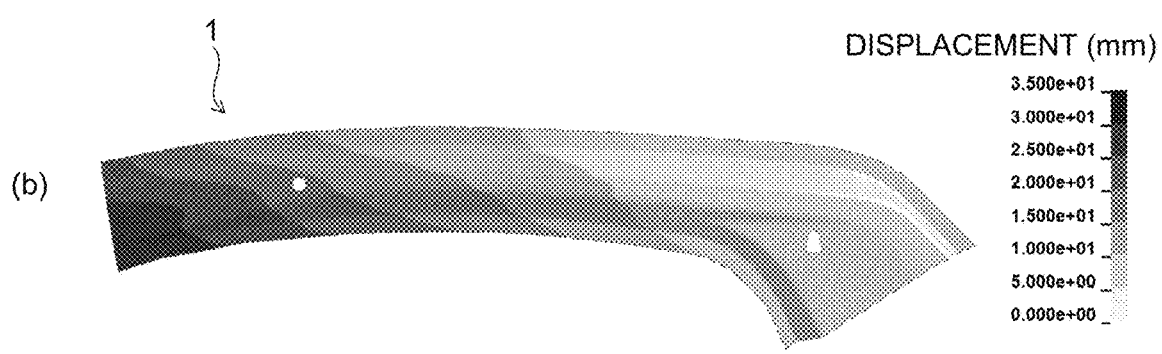
DISPLACEMENT (mm)
FIG.4
SECOND PRESS FORMING CONDITION [MATERIAL II (MATERIAL STRENGTH INCREASED BY 15%)]
(a)
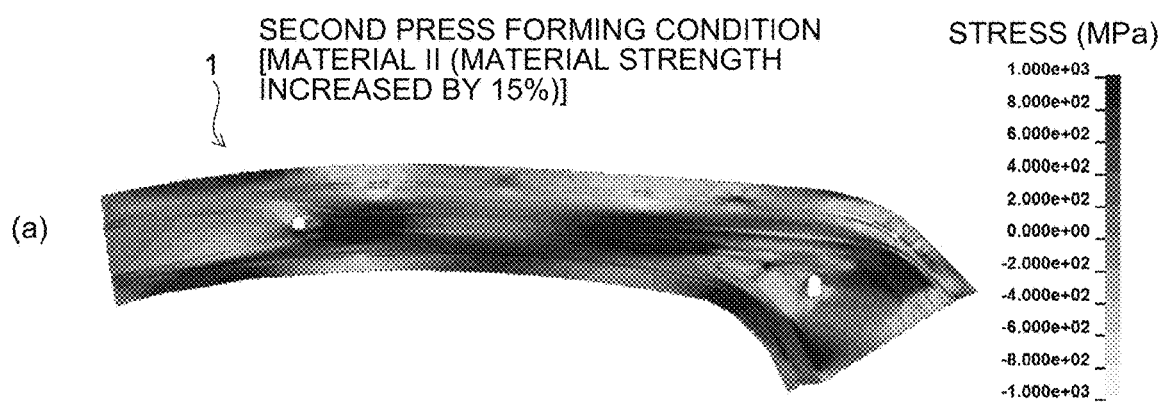
STRESS (MPa)
(b)
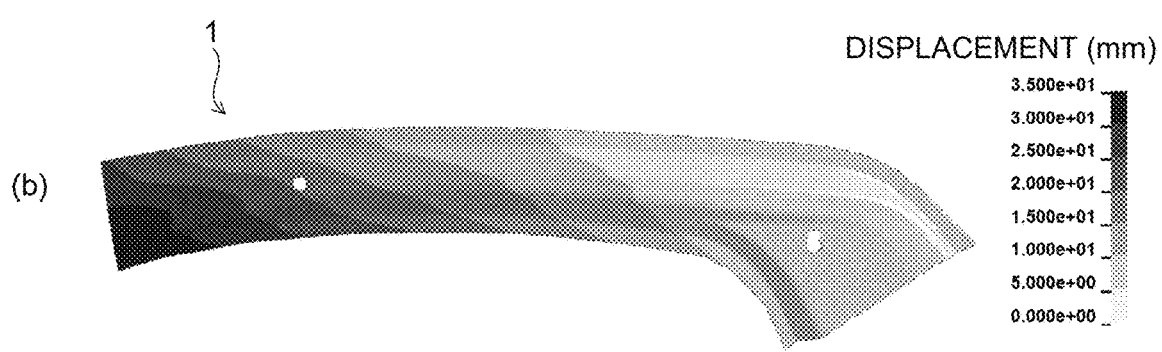
DISPLACEMENT (mm)

(a) DISPLACEMENT IN MATERIAL II (b) DISPLACEMENT IN MATERIAL I (c) (DISPLACEMENT IN MATERIAL II)−(DISPLACEMENT IN MATERIAL I)

(a) TORSION ANGLE (b) AMOUNT OF BENDING (a) RESIDUAL STRESS DISTRIBUTION OF MATERIAL I (b) RESIDUAL STRESS DISTRIBUTION OF MATERIAL II (c) STRESS DISTRIBUTION AFTER REPLACEMENT (a) STRESS DISTRIBUTION AFTER REPLACEMENT

SPRINGBACK ANALYSIS (b) DISPLACEMENT (a) STRESS REPLACED AREA (b) DISPLACEMENT (a) STRESS REPLACED AREA (b) DISPLACEMENT (a) STRESS REPLACED AREA (b) DISPLACEMENT (a) STRESS REPLACED AREA (b) DISPLACEMENT (a) STRESS REPLACED AREA (b) DISPLACEMENT (a) STRESS REPLACED AREA (b) DISPLACEMENT (a) STRESS REPLACED AREA (b) DISPLACEMENT (a) STRESS REPLACED AREA (b) DISPLACEMENT (a) STRESS REPLACED AREA (b) DISPLACEMENT (a) STRESS REPLACED AREA (b) DISPLACEMENT (a) STRESS REPLACED AREA (b) DISPLACEMENT (a) STRESS REPLACED AREA (b) DISPLACEMENT (a) STRESS REPLACED AREA (b) DISPLACEMENT (a) STRESS REPLACED AREA (b) DISPLACEMENT (a) STRESS REPLACED AREA (b) DISPLACEMENT

DISPLACEMENT (mm)

(a) STRESS REPLACED AREA (b) DISPLACEMENT

DISPLACEMENT (mm)

(a) STRESS REPLACED AREA (b) DISPLACEMENT (a) STRESS REPLACED AREA (b) DISPLACEMENT (a) DISPLACEMENT IN LUBRICANT II (b) DISPLACEMENT IN LUBRICANT I (c) (DISPLACEMENT IN LUBRICANT II)-(DISPLACEMENT IN LUBRICANT I)

(a) DISPLACEMENT IN BOTTOM DEAD CENTER II (b) DISPLACEMENT IN BOTTOM DEAD CENTER I (c) (DISPLACEMENT IN BOTTOM DEAD CENTER II)−(DISPLACEMENT IN BOTTOM DEAD CENTER I)

METHOD FOR IDENTIFYING VARIATION FACTOR PORTION OF SPRINGBACK AMOUNT

FIELD

The present invention relates to a method for identifying a variation factor portion of a springback amount, the method identifying a portion that is a factor for variation in springback amount in a press formed part due to scattering in press forming conditions or material properties of blank materials.

BACKGROUND

In press forming of metal sheets, in many cases, high shape accuracy is required for press formed parts, and the shape accuracy is required to be obtained always stably for scattering in press forming conditions during mass production. In reality, however, it is not easy to satisfy the requirements, and the shapes of press formed parts vary due to various factors for variation in press forming conditions, such as scattering in material properties of blank materials, increase in temperature of a tool of press forming due to continuous processing, seasonal change in environmental temperature, and variation in set position of blank materials. Against these problems, it is required to find out a method for reducing variation in press formed part shape when press forming conditions are scattered.

To satisfy the shape accuracy required for press forming of blank materials (blanks, for example, metal sheets), it is significantly important to reduce springback amount generated when a press formed part is taken out of a tool of press forming after press forming. Springback is the behavior of elastic recovery, which is generated when internal residual stress (bottom dead center residual stress) in a press formed part at the time (bottom dead center) of completion of sandwiching by upper and lower tools of press forming is released at the time of die release. To effectively reduce the springback amount, it is important to know which portion of and how bottom dead center residual stress in the press formed part affects the behavior of springback. From this viewpoint, methods for identifying a portion that is a factor for generation of springback by using finite element analysis have been proposed (Patent Literature 1 to Patent Literature 7). Patent Literature 8 discloses a method for confirming a relation between change in press forming conditions as countermeasures against springback and change in residual stress distribution as the entire shape of a press formed part before and after die release.

CITATION LIST

Patent Literature

Patent Literature 1: Japanese Patent Application Laid-open No. 2007-229724
Patent Literature 2: Japanese Patent Application Laid-open No. 2008-55476
Patent Literature 3: Japanese Patent Application Laid-open No. 2008-49389
Patent Literature 4: Japanese Patent Application Laid-open No. 2008-87015
Patent Literature 5: Japanese Patent Application Laid-open No. 2008-87035
Patent Literature 6: Japanese Patent Application Laid-open No. 2012-206158
Patent Literature 7: Japanese Patent Application Laid-open No. 2013-71120
Patent Literature 8: Japanese Patent Application Laid-open No. 2013-43182

SUMMARY

Technical Problem

In the methods disclosed in Patent Literature 1 to Patent Literature 7, the physical amount such as residual stress before springback is changed for a partial area of a press formed part, and the influence on the springback is evaluated, and hence a portion as a factor for the generation of springback itself can be identified. However, the methods do not involve the case where scattering in press forming conditions including variation in material properties of blank materials affects variation in springback amount. Furthermore, the method disclosed in Patent Literature 8 is to confirm the effect of springback countermeasures by visually displaying a change amount of finite difference in residual stress distribution before and after springback countermeasures, and does not identify a portion that is a factor for generation of springback, and scattering in press forming conditions is not taken into consideration. In this manner, the technology for evaluating variation in springback amount due to scattering in press forming conditions and further identifying where a factor for variation in springback amount is generated in the press formed part has not been proposed.

The present invention has been made in view of the above-mentioned problems, and it is an object thereof to provide a springback amount variation factor portion identifying method for identifying a portion where scattering in press forming conditions becomes a factor for variation in springback amount.

Press forming conditions in the present application are mechanical properties of a blank material (blank), the thickness and shape of the blank material, temperature of the blank material, sliding characteristics between the blank material and a tool of press forming, the relative position of the blank material with respect to the tool of press forming, the position and shape of a positioning device for the blank material, mechanical properties of the material of the tool of press forming, the shape of the surface of the tool of press forming, the internal structure of the tool of press forming, blank holder force, blank holder position, the position and shape of a device for applying blank holder force to component parts of the tool of press forming, the relative position of the component parts of the tool of press forming, the relative speed of movement of the tool of press forming, the vibration of the tool of press forming, the temperature of the tool of press forming, atmospheric temperature, atmospheric components, a pressurizing device, and electromagnetic environments. Scattering in press forming conditions refers to a state in which press forming conditions for the purpose of obtaining the same press formed part are scattered non-uniformly in a part or whole of processing space at the time of start of press forming, or during press forming or during die release.

Solution to Problem

To solve the problem and achieve the object, a method according to the present invention for identifying a variation factor portion of a springback amount, the method identifying a portion in a press formed part that is a factor for variation in a springback amount when variation occurs in the springback amount in the press formed part due to scattering in press forming conditions, and includes: a first residual stress distribution calculation step for performing press forming analysis under first press forming conditions set in advance, and calculating a residual stress distribution in a press formed part at a press forming bottom dead center; a first springback amount calculation step for performing springback analysis on the press formed part for which the residual stress distribution calculated at the first residual stress distribution calculation step has been set, and calculating a springback amount to be caused in the press formed part; a second residual stress distribution calculation step for performing press forming analysis under second press forming conditions set differently from the first press forming conditions within a range of the scattering in press forming conditions, and calculating a residual stress distribution in the press formed part at the press forming bottom dead center; a stress replacement step for replacing a value of residual stress in a partial area of the residual stress distribution in the press formed part calculated at the first residual stress distribution calculation step with a value of residual stress in an area corresponding to the partial area of the residual stress distribution in the press formed part calculated at the second residual stress distribution calculation step; a stress replaced springback amount calculation step for performing springback analysis on the press formed part for which the value of the residual stress has been replaced, and calculating a springback amount; and a springback amount variation factor portion identifying step for obtaining a difference between the springback amount calculated at the stress replaced springback amount calculation step and the springback amount calculated at the first springback amount calculation step, and identifying a portion in the press formed part that is a factor for variation in springback amount of the press formed part based on the obtained difference.

Moreover, a method according to the present invention for identifying a variation factor portion of a springback amount is a method for identifying a portion in a press formed part that is a factor for variation in a springback amount when variation occurs in the springback amount in the press formed part due to scattering in press forming conditions, and includes: a first residual stress distribution acquisition step for press forming a first press formed part under first press forming conditions in advance, creating a first press formed part model from three-dimensional shape measurement data obtained by measuring a surface shape of the first press formed part after die release, performing mechanical analysis in a state in which the first press formed part model is sandwiched by a tool-of-press-forming model until reaching a press forming bottom dead center, and acquiring residual stress distribution in the first press formed part at the press forming bottom dead center under the first press forming conditions; a second residual stress distribution acquisition step for press forming a second press formed part under second press forming conditions different from the first press forming conditions within a range of the scattering in press forming conditions in advance, creating a second press formed part model from three-dimensional shape measurement data obtained by measuring a surface shape of the second press formed part after die release, performing mechanical analysis in a state in which the second press formed part model is sandwiched by the tool-of-press-forming model until reaching the press forming bottom dead center, and acquiring residual stress distribution in the second press formed part at the press forming bottom dead center under the second press forming conditions; a first springback amount calculation step for performing springback analysis on the first press formed part for which the residual stress distribution acquired at the first residual stress distribution acquisition step has been set, and calculating a springback amount; a stress replacement step for replacing a value of residual stress in a partial area of the residual stress distribution in the first press formed part acquired at the first residual stress distribution acquisition step with a value of residual stress in an area corresponding to the partial area of the residual stress distribution in the second press formed part acquired at the second residual stress distribution acquisition step; a stress replaced springback amount calculation step for performing springback analysis on the first press formed part for which the value of the residual stress has been replaced, and calculating a springback amount; and a springback amount variation factor portion identifying step for obtaining a difference between the springback amount calculated at the stress replaced springback amount calculation step and the springback amount calculated at the first springback amount calculation step, and identifying a portion in the first press formed part that is a factor for variation in springback amount of the first press formed part based on the obtained difference.

Moreover, in the method for identifying the variation factor portion of the springback amount according to the present invention, the press forming conditions include mechanical properties of a blank material, a thickness and a shape of the blank material, temperature of the blank material, sliding characteristics between the blank material and a tool of press forming, a relative position of the blank material with respect to the tool of press forming, a position and a shape of a positioning device for the blank material, mechanical properties of a material of the tool of press forming, a shape of a surface of the tool of press forming, an internal structure of the tool of press forming, blank holder force, a blank holder position, a position and a shape of a device for applying blank holder force to component parts of the tool of press forming, an initial relative position of the component parts of the tool of press forming, relative speed of movement of the tool of press forming, vibration of the tool of press forming, temperature of the tool of press forming, atmospheric temperature, atmospheric components, a pressurizing device, and electromagnetic environments.

Advantageous Effects of Invention

According to the present invention, a portion that is a factor for variation in springback amount in a press formed part due to scattering in press forming conditions can be identified, and a portion in the press formed part for which countermeasures against shape stability for mass production of the press formed part are necessary can be accurately and easily identified.

BRIEF DESCRIPTION OF DRAWINGS

FIG. 1 is a flowchart illustrating the flow of processing in a springback amount variation factor portion identifying method according to a first embodiment of the present invention.

FIG. 2 is a diagram for describing press forming analysis in the first embodiment.

FIG. 3 is a diagram illustrating, in the first embodiment, an analysis result (a) of residual stress distribution at a press forming bottom dead center calculated by press forming analysis under first press forming conditions (material I) of material strength of a blank material and an analysis result (b) of displacement calculated by springback analysis based on the residual stress distribution.

FIG. 4 is a diagram illustrating, in the first embodiment, an analysis result (a) of residual stress distribution at the press forming bottom dead center calculated by press forming analysis under second press forming conditions (material II) in which the material strength of the blank material was increased by 15% and an analysis result (b) of displacement calculated by springback analysis based on the residual stress distribution.

DESCRIPTION OF EMBODIMENTS

Prior to describing a method for identifying a variation factor portion of a springback amount according to first and second embodiments of the present invention, the process to reach the present invention is first described.

[Process to Reach Present Invention]

In press forming of a press formed part 1 having a hat-shaped cross section as exemplified in FIG. 2, variation may occur in springback amount after die release of the press formed part 1 due to scattering in press forming conditions, such as variation in material properties of blank materials. A portion that is a factor for the variation in springback amount due to scattering in press forming conditions may be different from a portion that is a factor for the generation of springback itself. Thus, there is a problem in that even when springback is reduced by taking some countermeasures on the shapes of tools of press forming and press forming conditions, the variation in springback amount due to scattering in press forming conditions cannot be reduced.

To solve such a problem, the inventor of the present invention focused on the fact that a factor for variation in springback in press formed parts press formed under two different press forming conditions (first press forming conditions and second press forming conditions) as scattering in press forming conditions is due to difference between residual stress distribution at the press forming bottom dead center under the first press forming conditions and residual stress distribution at the press forming bottom dead center under the second press forming conditions.

To verify that the factor is due to the difference in residual stress distribution, in regard to two press forming conditions in which material strengths of blank materials have scattering as illustrated in Table 1, press forming analysis on a press formed part 1 having a hat-shaped cross section illustrated in FIG. 2 was performed to calculate residual stress distribution at the press forming bottom dead center, and further, displacement caused by springback was calculated by springback analysis using the residual stress distribution calculated for each of the first press forming conditions and the second press forming conditions. Note that "material II" illustrated in Table 1 has the material strength of the blank material increased by 15% as compared with "material I".

TABLE 1

| | Material | Thickness t [mm] | Material strength | |
|---|---|---|---|---|
| | | | YP [MPa] | TS [MPa] |
| First press forming condition | Material I | 1.4 | 687 | 1011 |
| Second press forming condition | Material II | 1.4 | 790 | 1163 |

Figure 5:
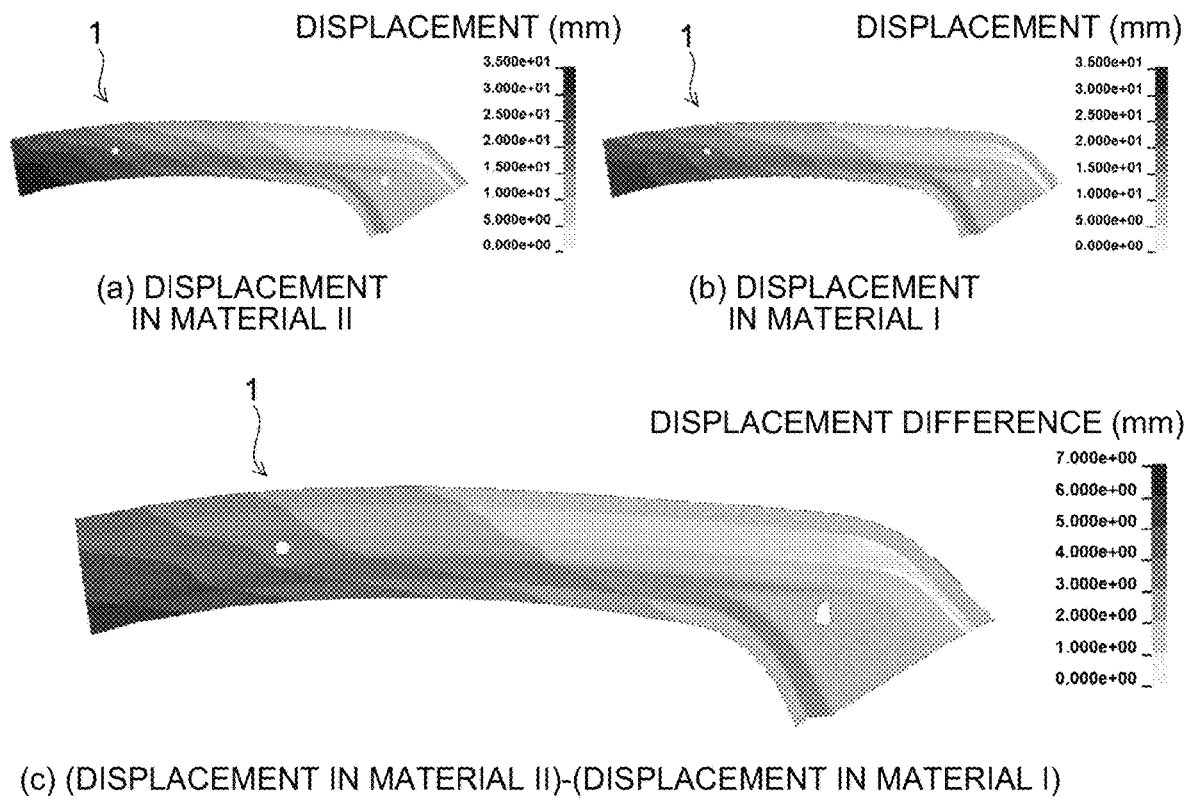
FIG. 5 is a diagram illustrating, in the process to reach the present invention, an analysis result of difference in displacement calculated by springback analysis in the case where there was scattering of the material strength as the press forming conditions.

FIG. 3 and FIG. 4 illustrate analysis results of residual stress distribution (a) at the press forming bottom dead center calculated under the press forming conditions of the material I and the material II, and displacement (b) caused by springback after die release of the press formed parts press formed under the press forming conditions. FIG. 5 illustrate difference between the displacements caused by springback under the two press forming conditions.

The inventor made a study for the reason why variation occurs in springback after die release due to scattering in press forming conditions (material strengths) based on the results illustrated in FIGS. 3 to FIGS. 5. As a result, the inventor thought that difference in residual stress distribution at the press forming bottom dead center under the two different press forming conditions is equal to a driving force for transition from the state after springback under the first press forming conditions to the state after springback under the second press forming conditions.

That is, it is supposed that the difference in displacement caused by springback under the first press forming conditions and the second press forming conditions illustrated in FIG. 5 can be regarded as difference between displacement caused by springback, when the residual stress distribution (FIG. 3(a)) at the press forming bottom dead center under the first press forming conditions was replaced with the residual stress distribution (FIG. 4(a)) at the press forming bottom dead center under the second press forming conditions, and displacement caused by springback due to the residual stress distribution at the press forming bottom dead center under the first press forming conditions. The inventor thought that, in this case, displacement caused by springback, when the residual stress distribution under the first press forming conditions was replaced with the residual stress distribution under the second press forming conditions, can be regarded as variation in springback caused due to scattering in press forming conditions between the first press forming conditions and the second press forming conditions.

On the basis of the above-mentioned thought, the inventor made a further study for a method for identifying a portion where scattering in press forming conditions becomes a factor for variation in springback. As a result, the inventor obtained the finding that when displacement caused by springback was calculated by replacing a part of the residual stress distribution at the press forming bottom dead center at the time of press forming under the first press forming conditions with the corresponding part of the residual stress distribution at the press forming bottom dead center at the time of press forming under the second press forming conditions, there are a portion where variation occurs in springback and a portion where variation does not occur in springback depending on difference in area in which residual stress was replaced.

The springback amount variation factor portion identifying method according to the present invention was completed through the above-mentioned finding, and specific methods are described in the following first embodiment and second embodiment. The following description relates to an exemplary case in which there is scattering in material strength of blank materials as scattering in press forming conditions as illustrated in Table 1 described above.

First Embodiment

A springback amount variation factor portion identifying method according to a first embodiment of the present invention identifies, when variation occurs in springback amount of a press formed part due to scattering in press forming conditions, a portion in the press formed part that is a factor for variation in springback amount, and includes, as illustrated in FIG. 1, a first residual stress distribution calculation step S1, a first springback amount calculation step S3, a second residual stress distribution calculation step S5, a stress replacement step S7, a stress replaced springback amount calculation step S9, and a springback amount variation factor portion identifying step S11.

<First Residual Stress Distribution Calculation Step>

The first residual stress distribution calculation step S1 is a step for performing press forming analysis under first press forming conditions set in advance and calculating a residual stress distribution in the press formed part 1 at the press forming bottom dead center.

In the first embodiment, as illustrated in FIG. 2, press forming analysis is performed under the first press forming conditions such that a blank 9 as a blank material is sandwiched by a tool-of-press-forming model 3 formed from a die 5 and a punch 7, and as illustrated in FIG. 3(a), the residual stress distribution in the press formed part 1 at the press forming bottom dead center is calculated. The material strength of the material I with the plate thickness of 1.4 mm illustrated in Table 1 is set to the blank 9 as the first press forming conditions. Then, in the press forming analysis, the blank 9 was fixed by positioning pins in the course of press forming as illustrated in FIG. 2, and the element size of the blank 9 was about 1 mm, and the frictional coefficient between the blank 9 and the tool-of-press-forming model 3 was set to 0.15 while the position of the press forming bottom dead center was set such that a gap between upper and lower tools of press forming was 1.45 mm as analysis conditions.

At the first residual stress distribution calculation step S1, a computer performs the press forming analysis. For the press forming analysis, for example, finite element analysis software can be used. In the first embodiment, LS-DYNA Ver.971, which is commercially available finite element analysis software, was executed on the computer to perform the press forming analysis, and a dynamic explicit method was applied to a solver.

The present invention is not limited to the case where the tool-of-press-forming model 3 as illustrated in FIG. 2 is used and the case where the press formed part 1 having the hat-shaped cross section is to be press formed. The present invention can appropriately set the tool-of-press-forming model and the press formed part depending on the press forming target.

<First Springback Amount Calculation Step>

The first springback amount calculation step S3 is a step for performing springback analysis on the press formed part 1 for which the residual stress distribution in the press formed part 1 at the press forming bottom dead center calculated at the first residual stress distribution calculation step S1 has been set, and calculating springback amount such as a torsion angle or an amount of bending to be caused in the press formed part 1.

In the first embodiment, the springback amount to be caused in the press formed part 1 (FIG. 3(a)) for which the residual stress distribution calculated at the first residual stress distribution calculation step S1 has been set was calculated in accordance with the following procedure.

Figure 6:
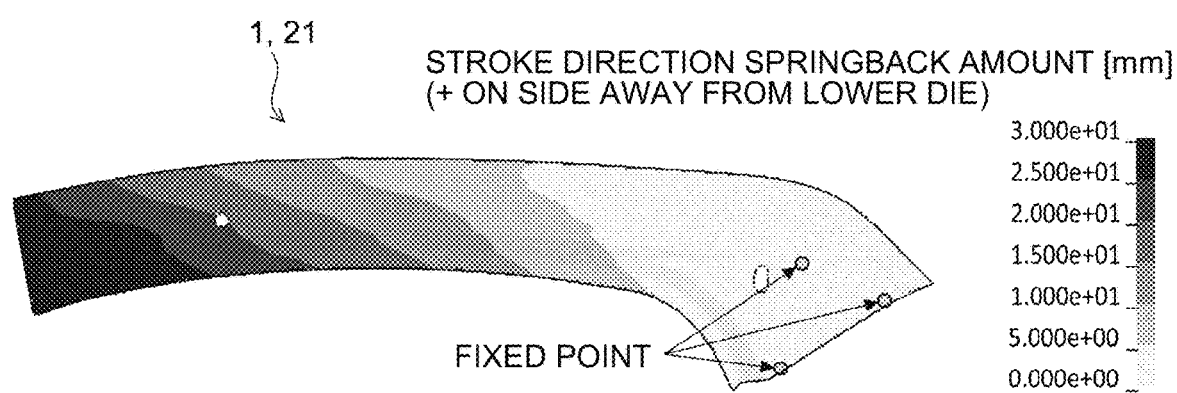
FIG. 6 is a diagram illustrating an analysis result of fixed points in a press formed part when displacement was determined by springback analysis in the first embodiment and displacement that occurred in the press formed part.

First, springback analysis was performed for the press formed part 1 (FIG. 3(a)) for which the residual stress distribution calculated at the first residual stress distribution calculation step S1 had been set, and displacement (FIG. 3(b)) caused by springback was calculated. In the springback analysis, as illustrated in FIG. 6, fixed points at three locations provided on one end side of the press formed part 1 were fixed, and displacement caused by springback was calculated.

Figure 7:
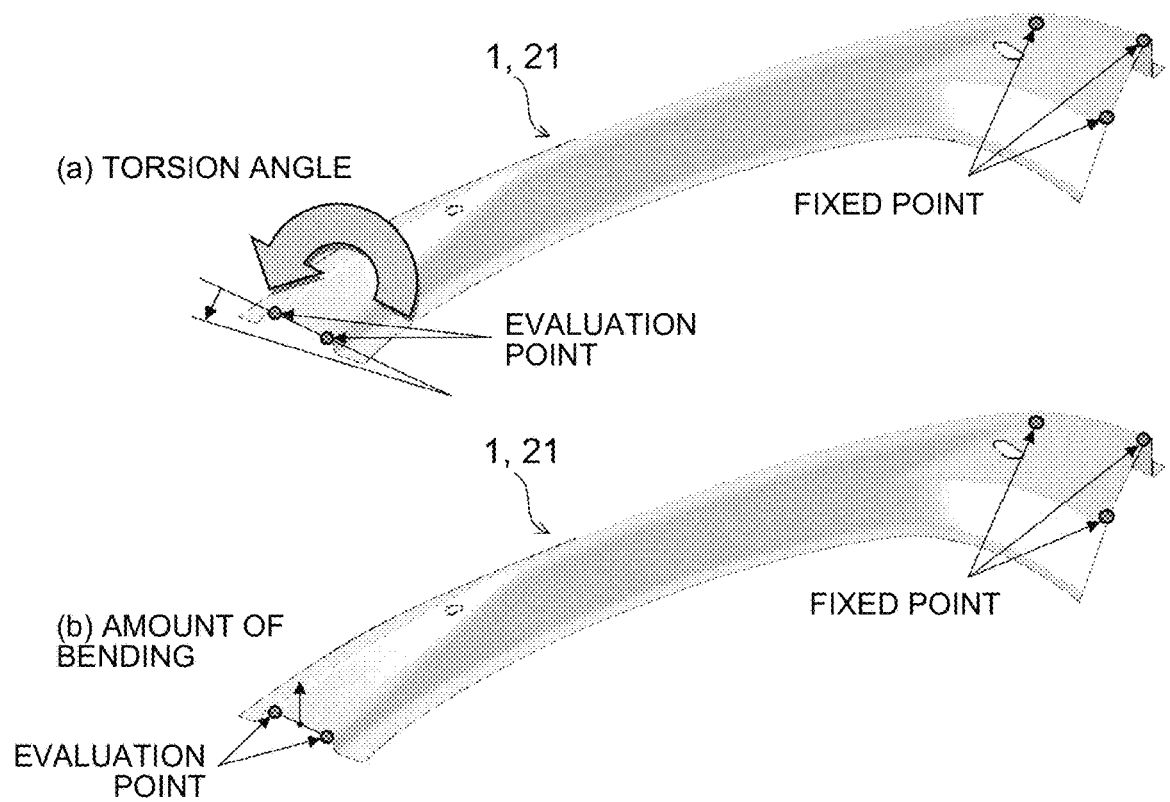
FIG. 7 is a diagram for describing methods for calculating a torsion angle and an amount of bending as springback amount in the first embodiment and a second embodiment.

Next, a torsion angle (FIG. 7(a)) and an amount of bending (FIG. 7(b)) were calculated as springback amount based on the calculated displacement caused by springback. As illustrated in FIG. 7(a), the torsion angle was a rotation angle (positive in arrow direction in FIG. 7(a)) caused by torsion in a straight line connecting evaluation points at two locations provided on the other end side of the press formed part 1. As illustrated in FIG. 7(b), the amount of bending was displacement (positive in direction away from the punch 7) in a press forming stroke direction at a midpoint between the two evaluation points.

Furthermore, at the first springback amount calculation step S3, a computer performs the springback analysis. For the springback analysis, for example, finite element analysis software can be used. In the first embodiment, LS-DYNA Ver.971, which is commercially available finite element analysis software, was executed on the computer to perform the springback analysis, and a static implicit method was applied to a solver.

<Second Residual Stress Distribution Calculation Step>

The second residual stress distribution calculation step S5 is a step for performing press forming analysis under the second press forming conditions set so as to differ from the first press forming conditions within the range of scattering in press forming conditions, and calculating the residual stress distribution in the press formed part 1 at the press forming bottom dead center.

In the first embodiment, similarly to the above-mentioned first residual stress distribution calculation step S1, as illustrated in FIG. 2, the press forming analysis is performed under the second press forming conditions such that the blank 9 is sandwiched by the tool-of-press-forming model 3 formed from the die 5 and the punch 7, and as illustrated in FIG. 4(a), the residual stress distribution in the press formed part 1 at the press forming bottom dead center is calculated. Then, the material strength of the material II illustrated in Table 1 is set to the blank 9 as the second press forming conditions. Furthermore, in the press forming analysis, the blank 9 was fixed, and the element size of the blank 9, the frictional coefficient between the blank 9 and the tool-of-press-forming model 3, and the position of the press forming bottom dead center were set similarly to the above-mentioned first residual stress distribution calculation step S1.

In the second residual stress distribution calculation step S5, similarly to the above-mentioned first residual stress distribution calculation step S1, a computer performs the press forming analysis.

<Stress Replacement Step>

The stress replacement step S7 is a step for replacing the value of the residual stress in a partial area of the residual stress distribution in the press formed part 1 at the press forming bottom dead center calculated at the first residual stress distribution calculation step S1 with the value of the residual stress in an area corresponding to the partial area of the residual stress distribution in the press formed part 1 at the press forming bottom dead center calculated at the second residual stress distribution calculation step S5.

In the first embodiment, the value of the residual stress in a partial area $R_A$ of the residual stress distribution (FIG. 8(a)) in the press formed part 1 at the press forming bottom dead center calculated in the case of press forming using the material I as the first press forming conditions is replaced with the value of the residual stress in an area $R_B$ corresponding to the partial area $R_A$ of the residual stress distribution (FIG. 8(b)) in the press formed part 1 at the press forming bottom dead center calculated in the case of press forming using the material II as the second press forming conditions (FIG. 8(c)).

Figure 9:
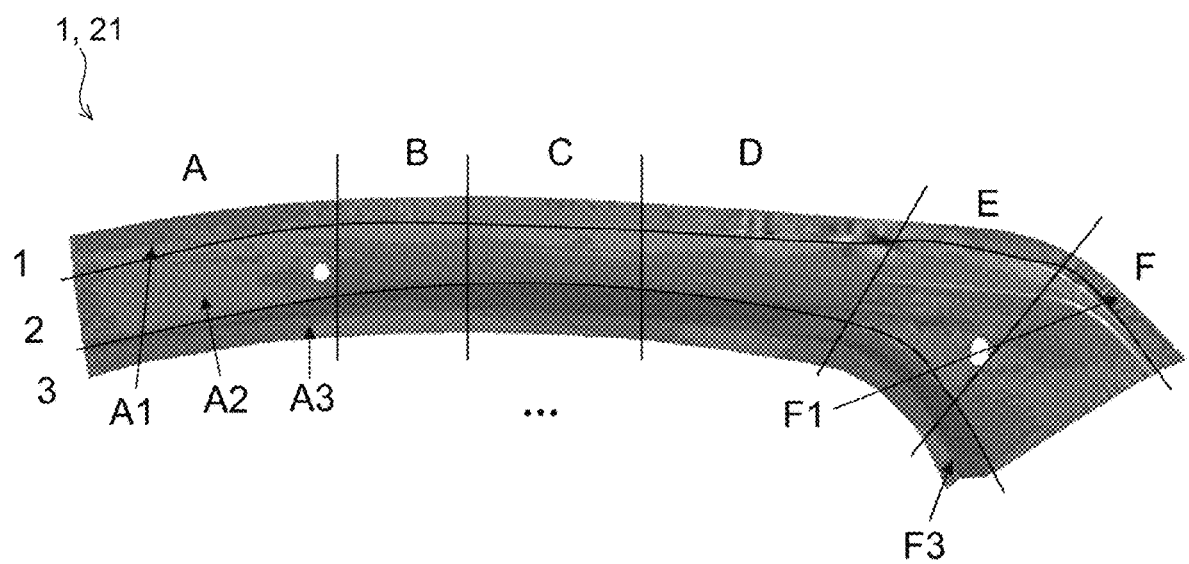
FIG. 9 is a diagram for describing division of areas in a press formed part in the first embodiment.

The press formed part 1 was divided into a plurality of areas, namely, into six of A to F in longitudinal direction and into three of 1 to 3 in width direction, for example, as illustrated in FIG. 9, and any one of the areas (A1, A2, A3, . . . , F3) was selected as the partial area $R_A$ in the press formed part 1 for which the value of the residual stress is replaced or the area $R_B$ corresponding thereto.

<Stress Replaced Springback Amount Calculation Step>

The stress replaced springback amount calculation step S9 is a step for performing springback analysis on the press formed part for which the value of the residual stress in the partial area of the residual stress distribution was replaced at the stress replacement step S7, and calculating springback amount to be caused in the press formed part.

Figure 10:
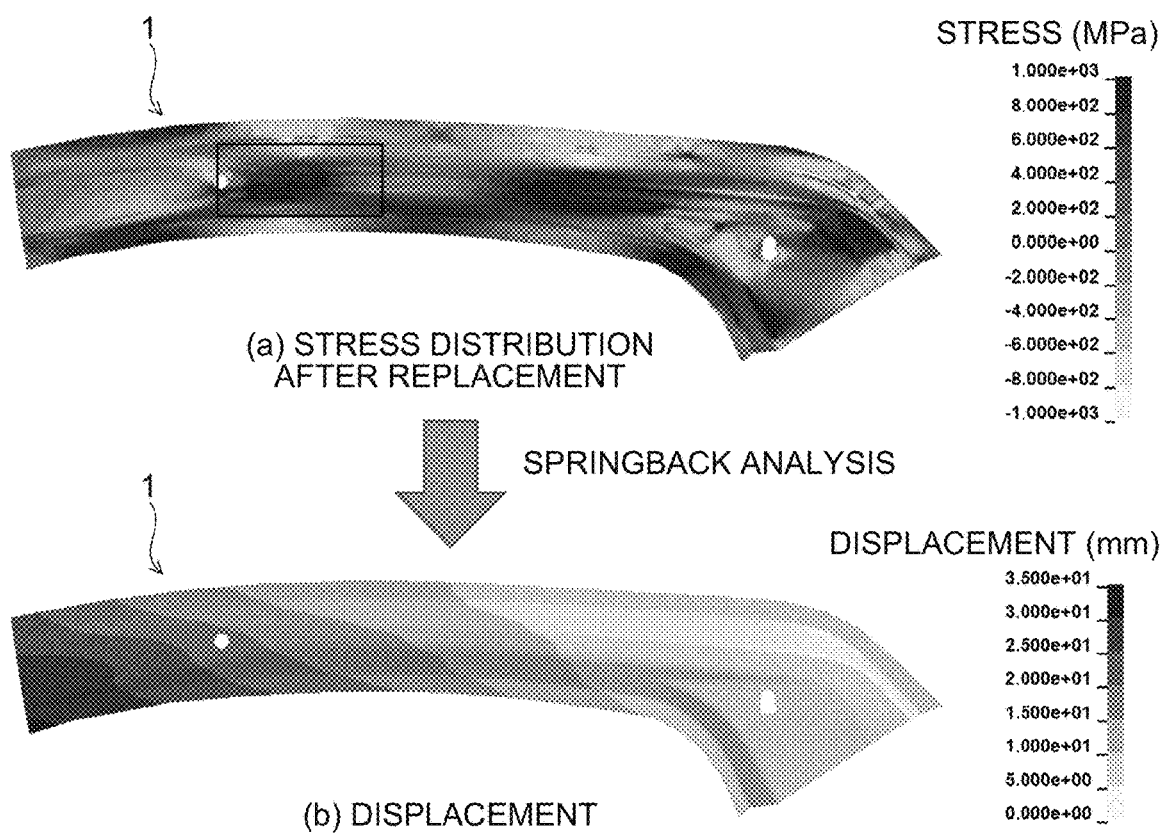
FIG. 10 is a diagram illustrating, in the first embodiment, stress distribution (a) in which the value of the residual stress in a partial area of the residual stress distribution at the press forming bottom dead center of the material I is replaced with the value of the residual stress in an area corresponding to the partial area of the residual stress distribution at the press forming bottom dead center of the material II, and displacement (b) calculated by springback analysis in the stress distribution in which the residual stress was replaced.
Figure 11:
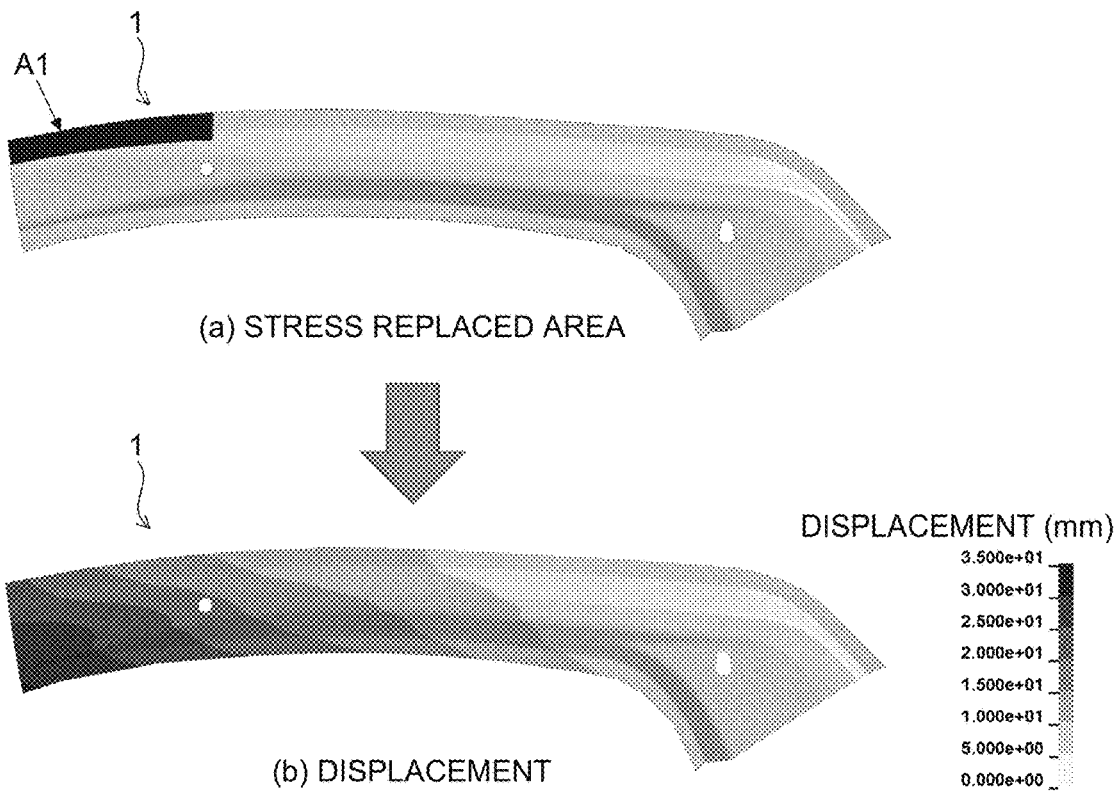
FIG. 11 is a diagram illustrating, in the first embodiment, an area (a) in which residual stress is replaced and displacement (b) calculated by springback analysis by replacing the residual stress in the area (No. 1).
Figure 12:
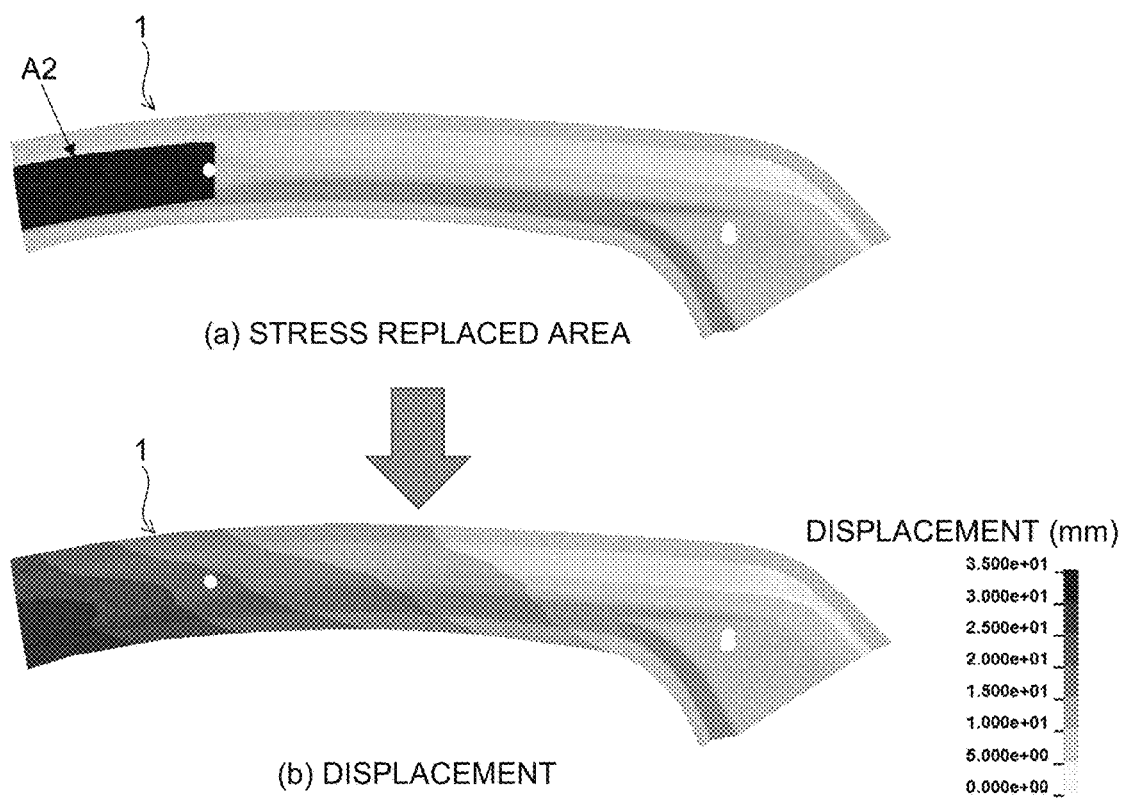
FIG. 12 is a diagram illustrating, in the first embodiment, an area (a) in which residual stress is replaced and displacement (b) calculated by springback analysis by replacing the residual stress in the area (No. 2).
Figure 13:
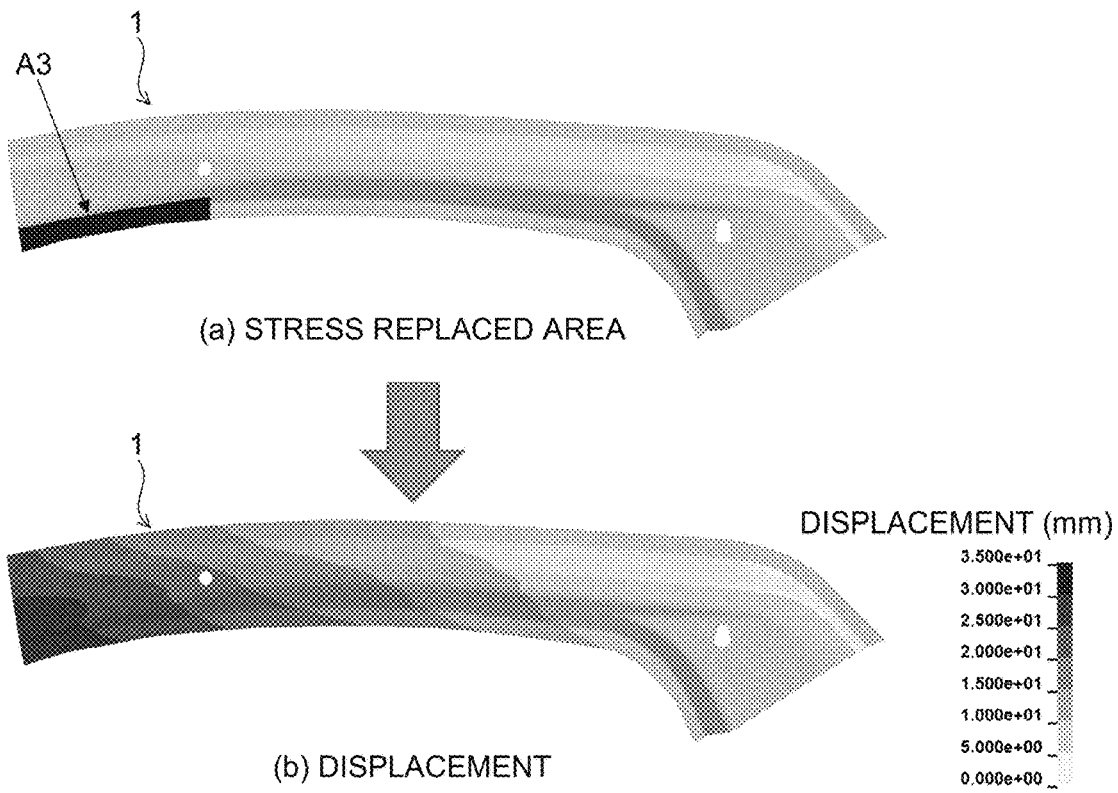
FIG. 13 is a diagram illustrating, in the first embodiment, an area (a) in which residual stress is replaced and displacement (b) calculated by springback analysis by replacing the residual stress in the area (No. 3).
Figure 14:
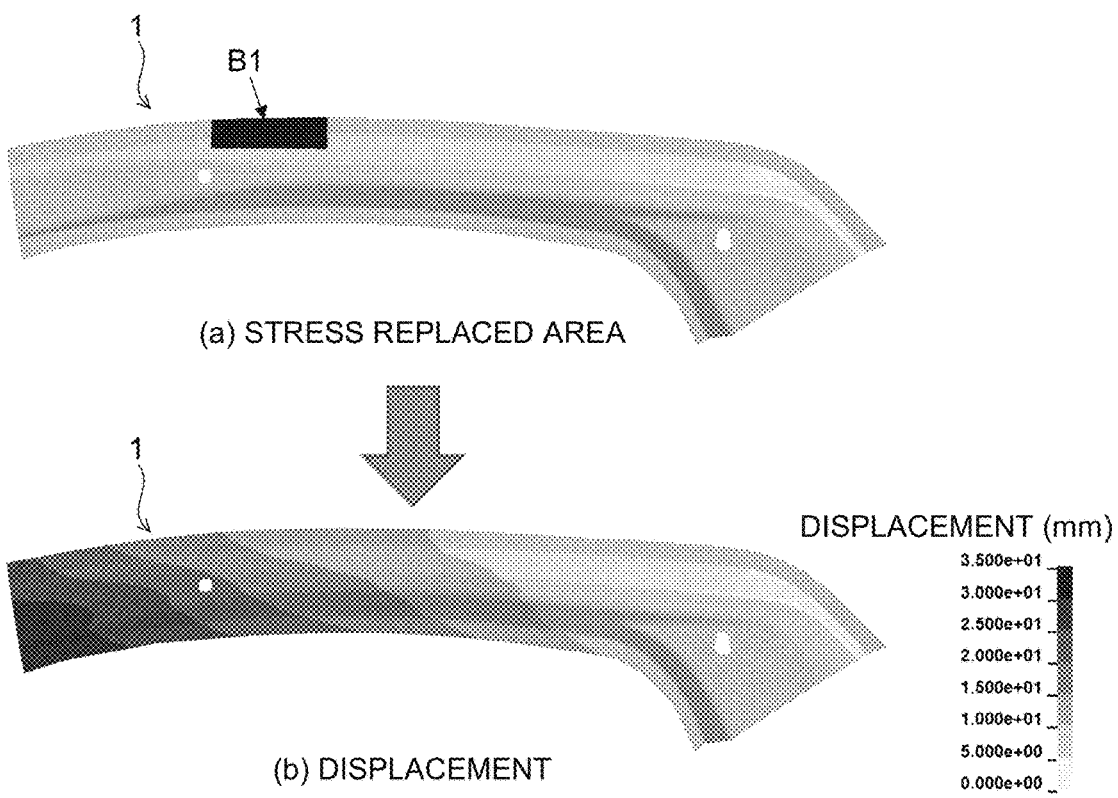
FIG. 14 is a diagram illustrating, in the first embodiment, an area (a) in which residual stress is replaced and displacement (b) calculated by springback analysis by replacing the residual stress in the area (No. 4).
Figure 15:
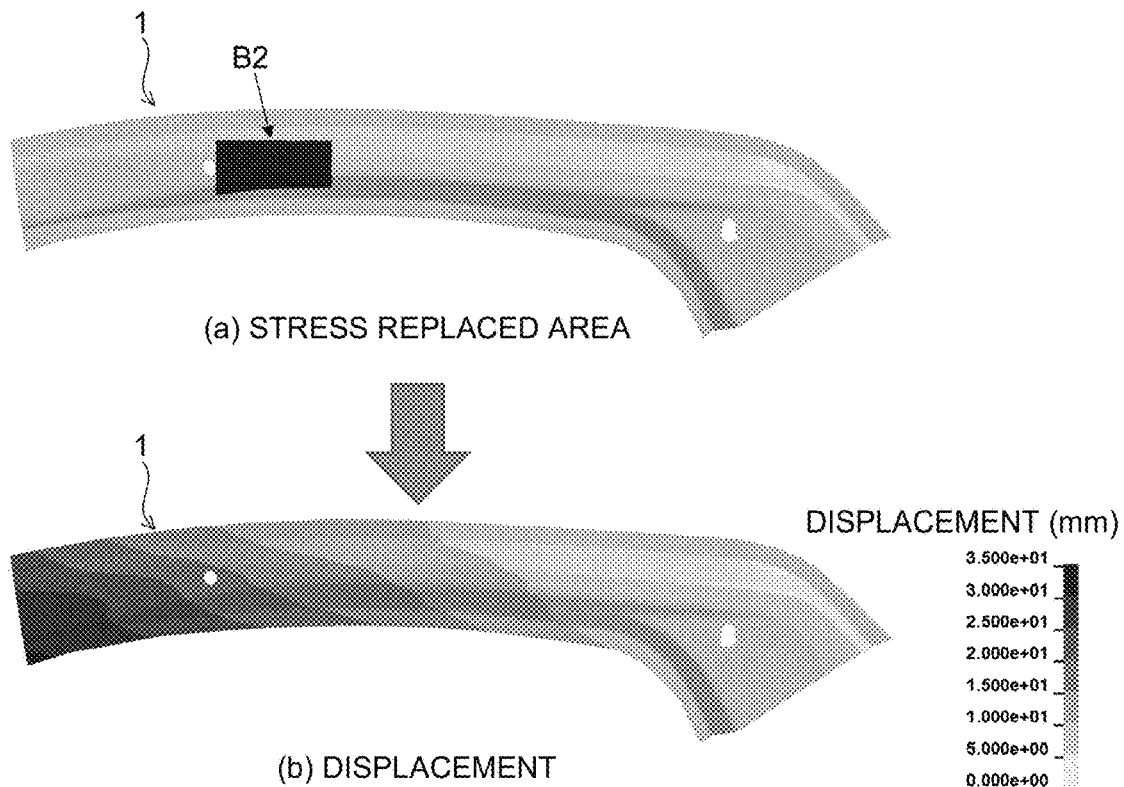
FIG. 15 is a diagram illustrating, in the first embodiment, an area (a) in which residual stress is replaced and displacement (b) calculated by springback analysis by replacing the residual stress in the area (No. 5).
Figure 16:
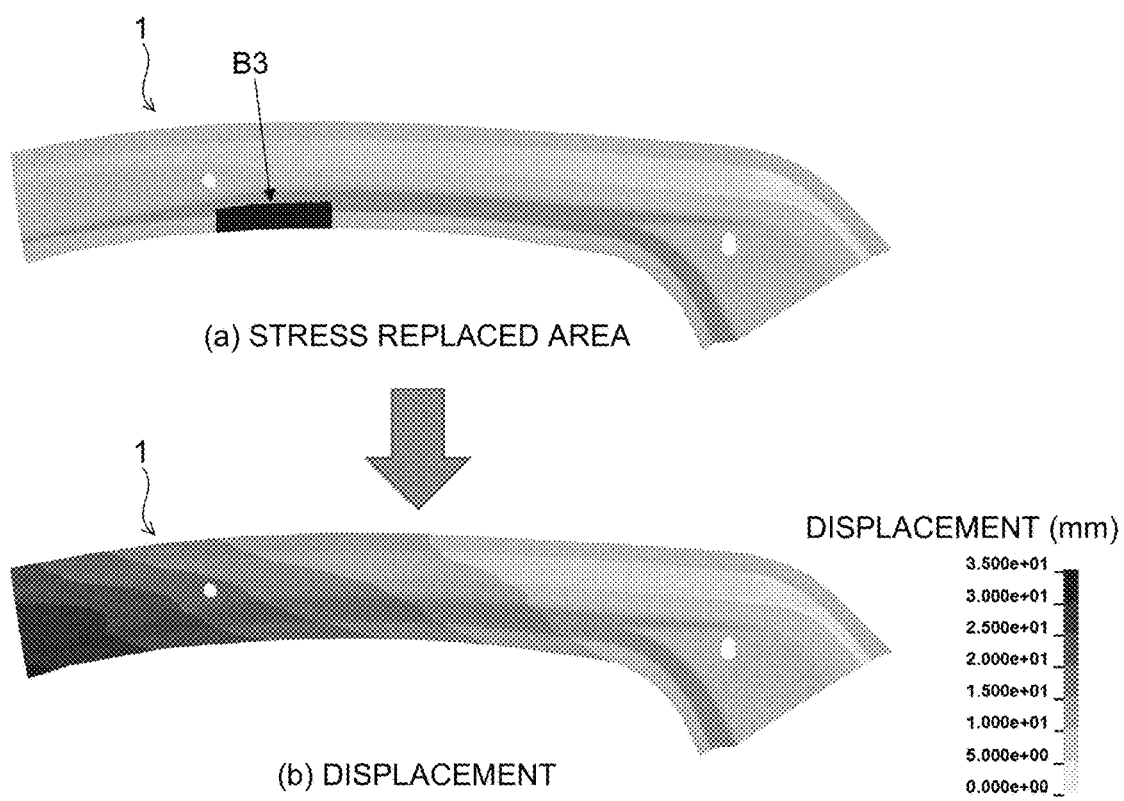
FIG. 16 is a diagram illustrating, in the first embodiment, an area (a) in which residual stress is replaced and displacement (b) calculated by springback analysis by replacing the residual stress in the area (No. 6).
Figure 17:
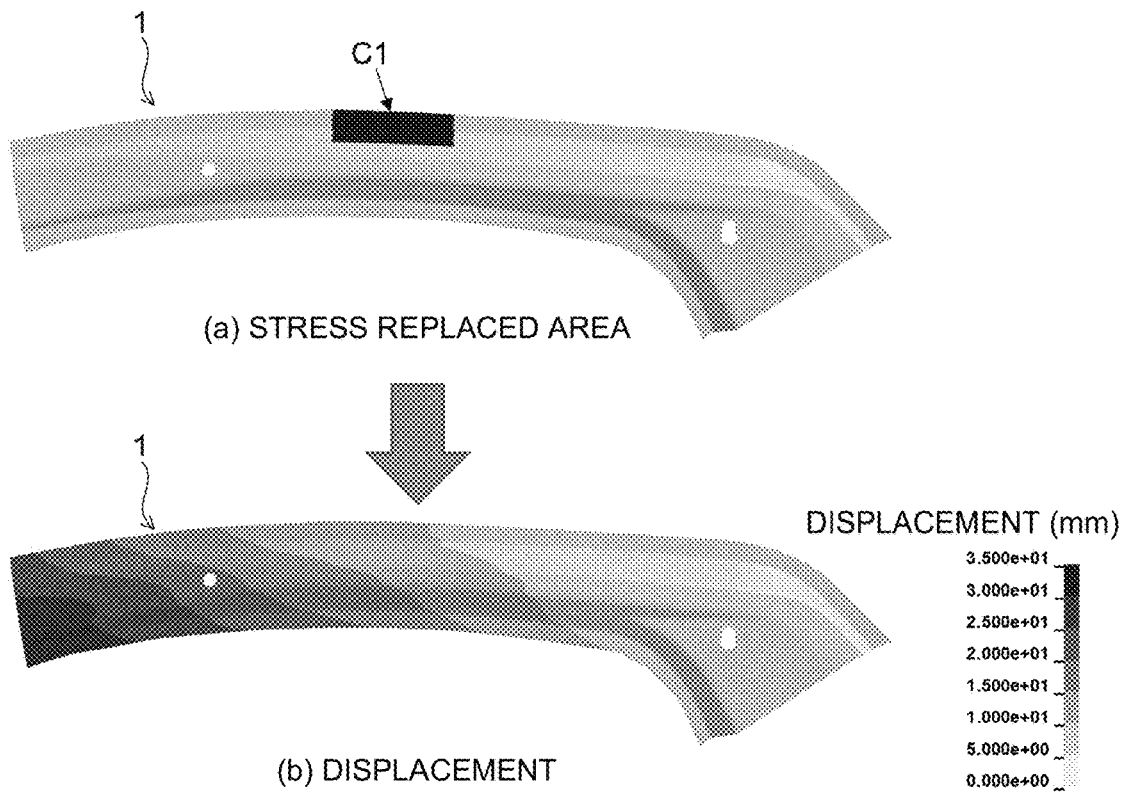
FIG. 17 is a diagram illustrating, in the first embodiment, an area (a) in which residual stress is replaced and displacement (b) calculated by springback analysis by replacing the residual stress in the area (No. 7).
Figure 18:
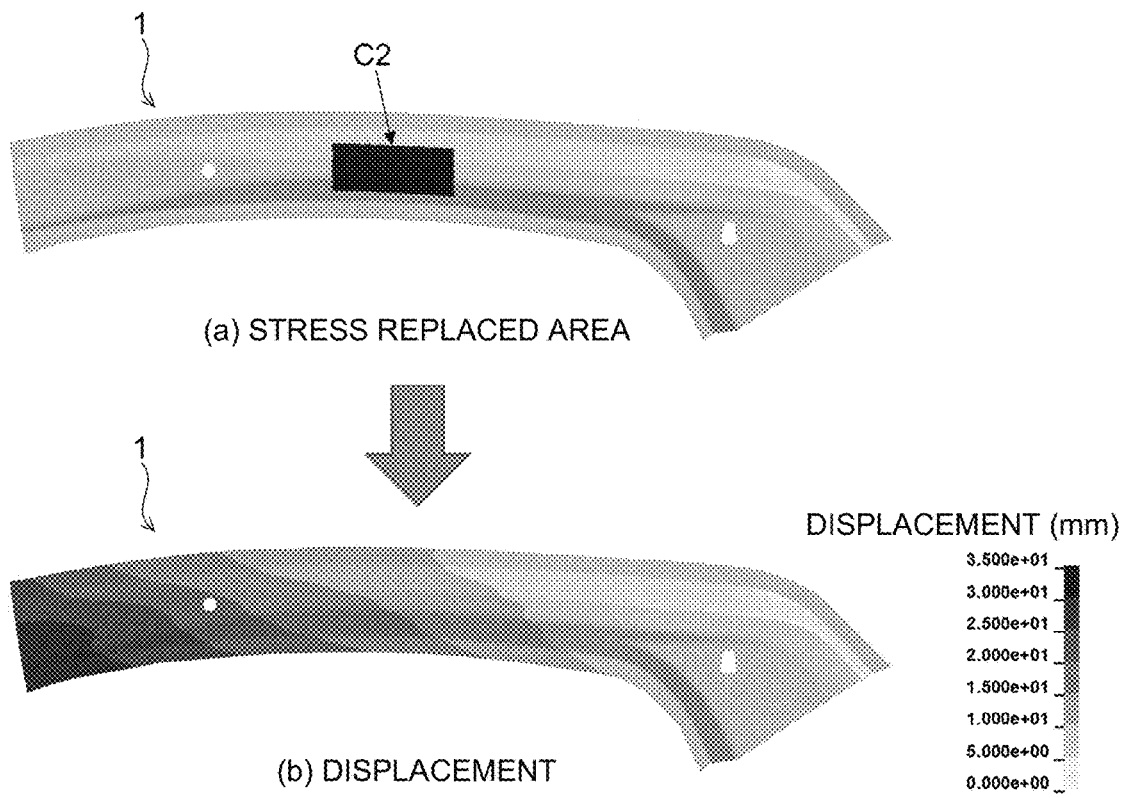
FIG. 18 is a diagram illustrating, in the first embodiment, an area (a) in which residual stress is replaced and displacement (b) calculated by springback analysis by replacing the residual stress in the area (No. 8).
Figure 19:
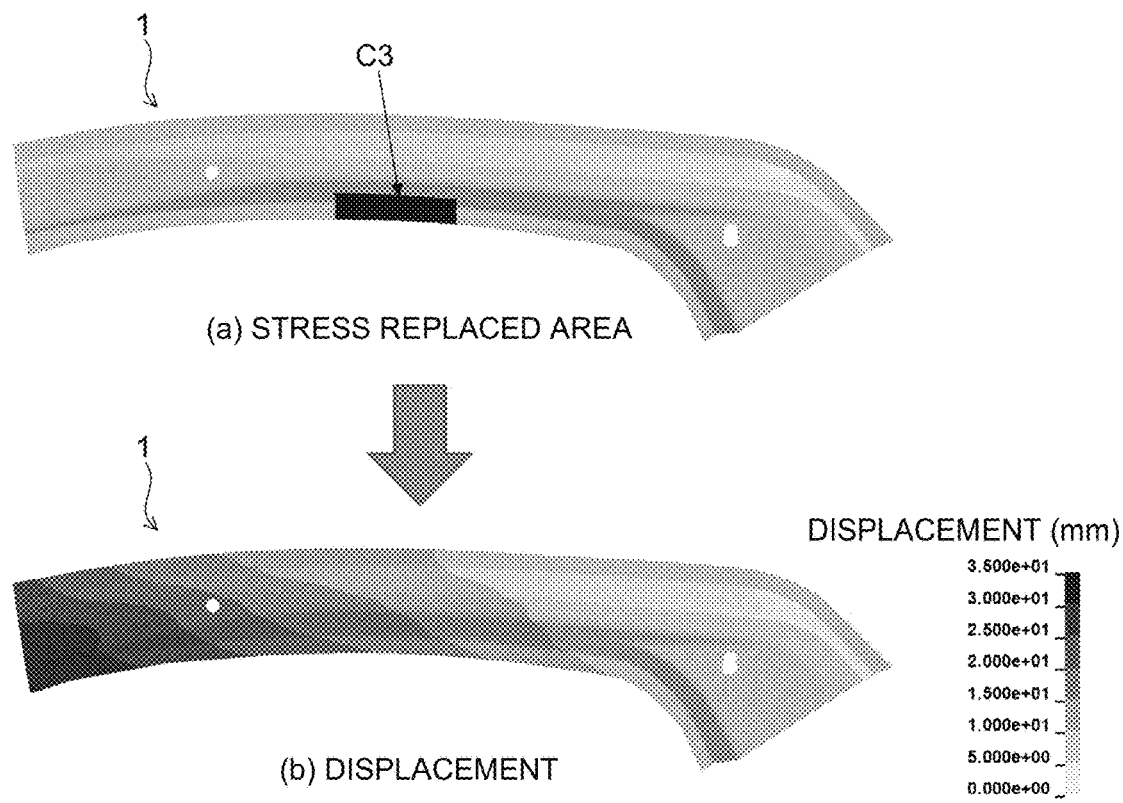
FIG. 19 is a diagram illustrating, in the first embodiment, an area (a) in which residual stress is replaced and displacement (b) calculated by springback analysis by replacing the residual stress in the area (No. 9).
Figure 20:
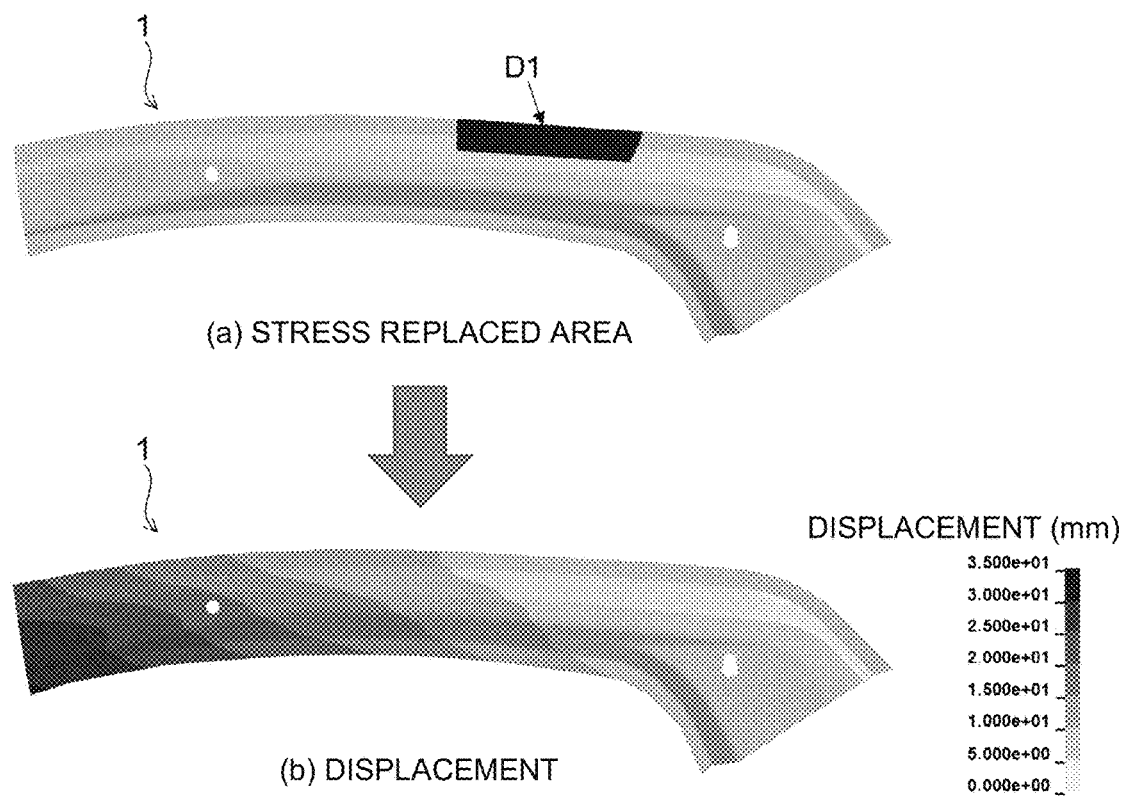
FIG. 20 is a diagram illustrating, in the first embodiment, an area (a) in which residual stress is replaced and displacement (b) calculated by springback analysis by replacing the residual stress in the area (No. 10).
Figure 21:
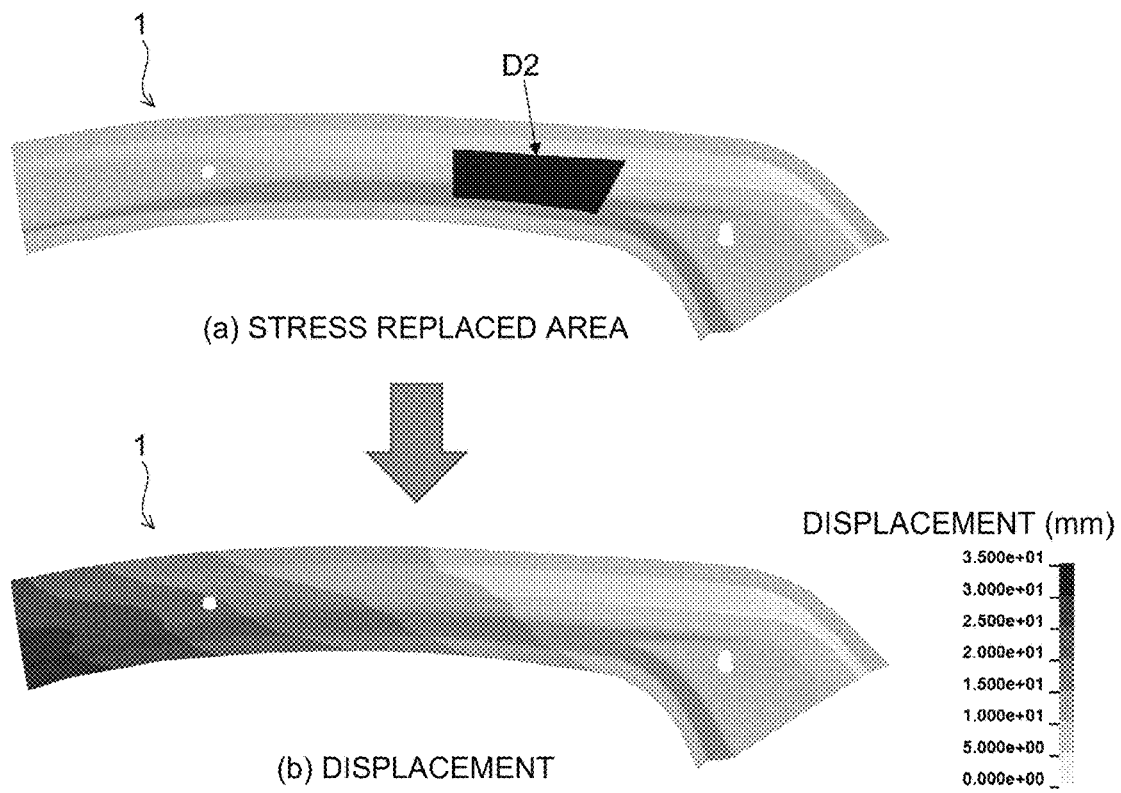
FIG. 21 is a diagram illustrating, in the first embodiment, an area (a) in which residual stress is replaced and displacement (b) calculated by springback analysis by replacing the residual stress in the area (No. 11).
Figure 22:
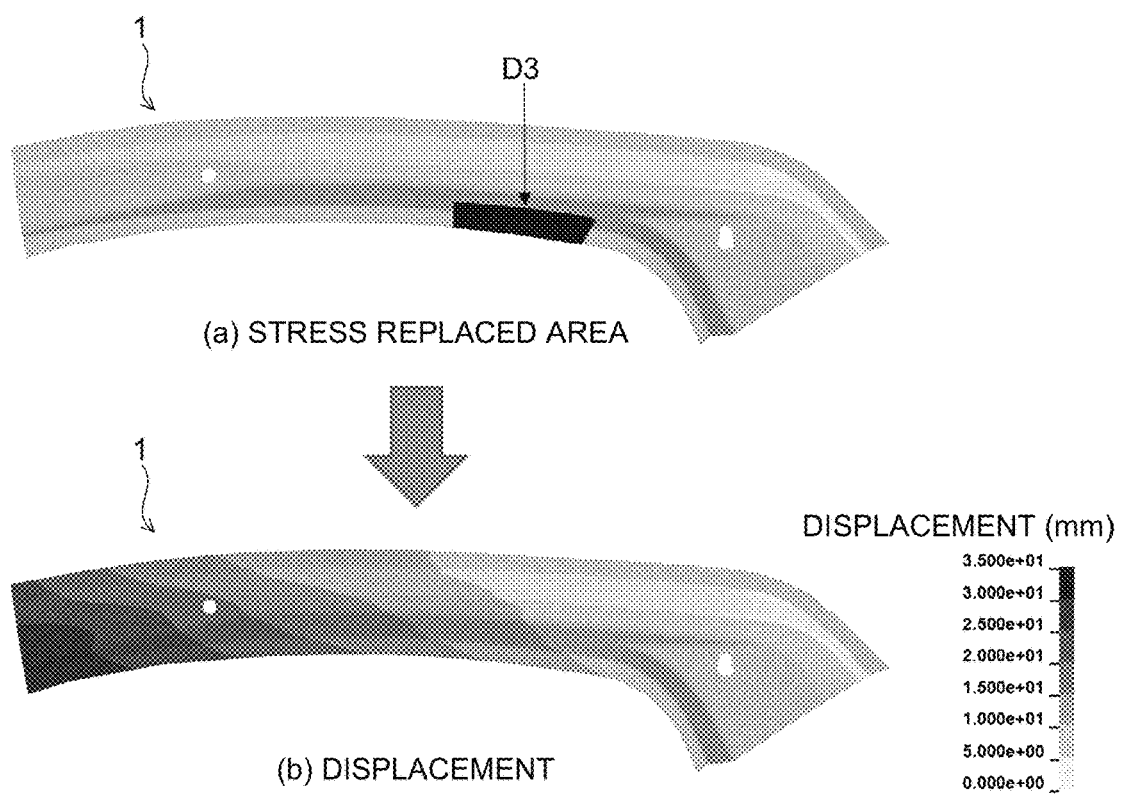
FIG. 22 is a diagram illustrating, in the first embodiment, an area (a) in which residual stress is replaced and displacement (b) calculated by springback analysis by replacing the residual stress in the area (No. 12).
Figure 23:
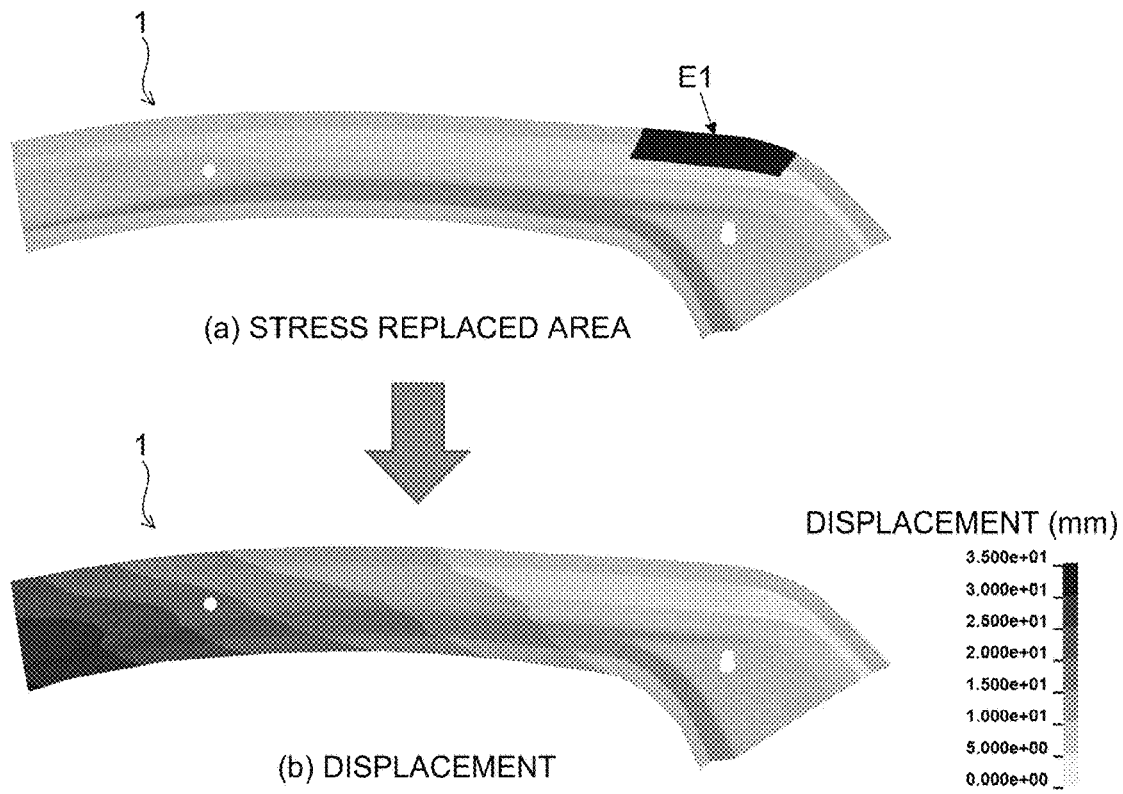
FIG. 23 is a diagram illustrating, in the first embodiment, an area (a) in which residual stress is replaced and displacement (b) calculated by springback analysis by replacing the residual stress in the area (No. 13).
Figure 24:
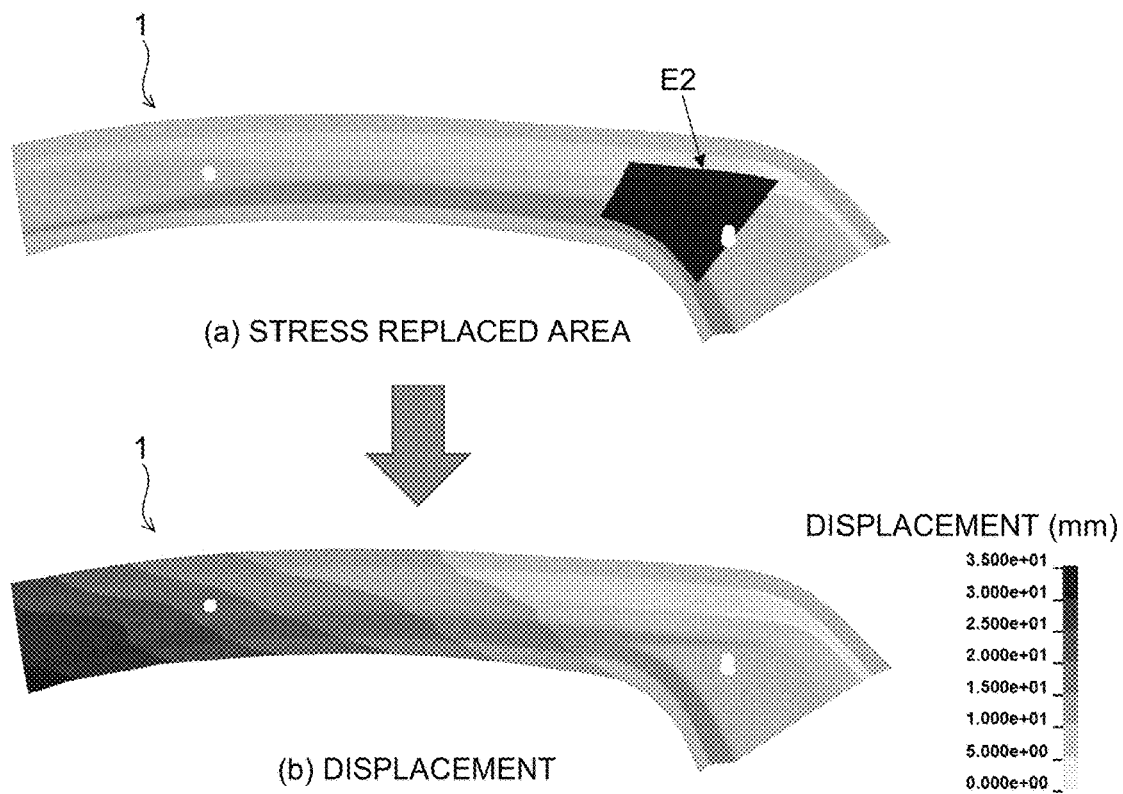
FIG. 24 is a diagram illustrating, in the first embodiment, an area (a) in which residual stress is replaced and displacement (b) calculated by springback analysis by replacing the residual stress in the area (No. 14).
Figure 25:
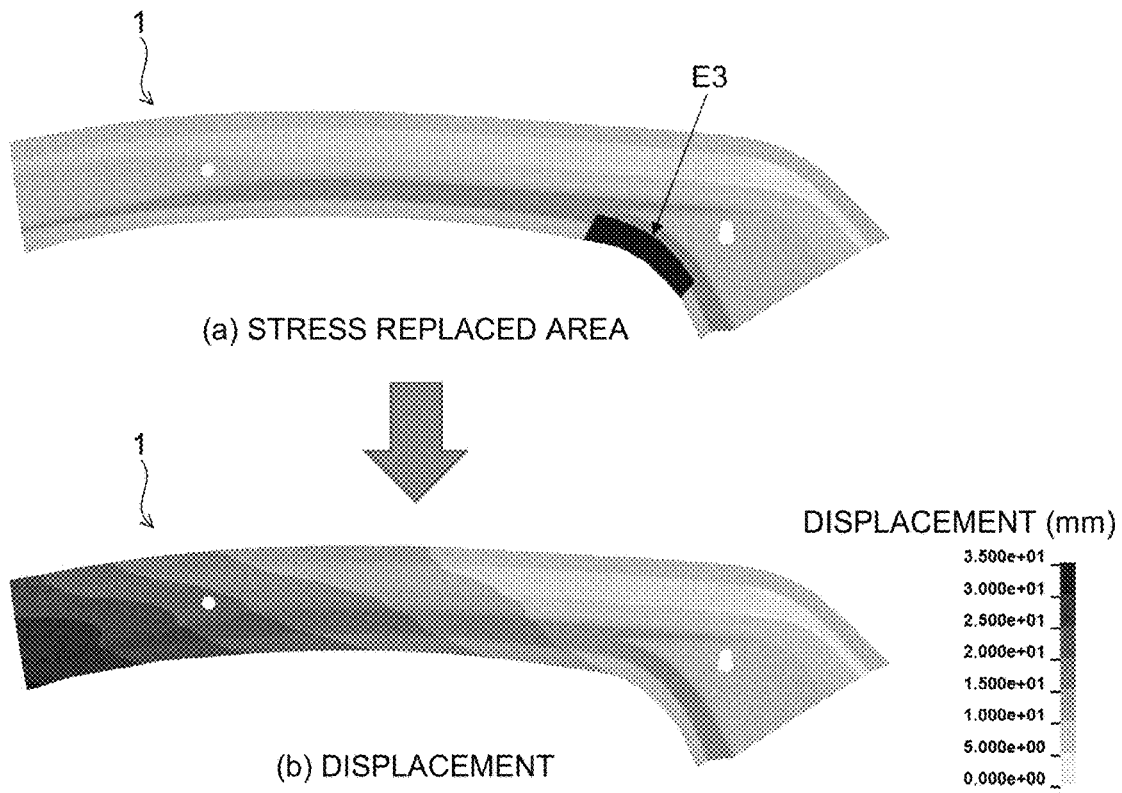
FIG. 25 is a diagram illustrating, in the first embodiment, an area (a) in which residual stress is replaced and displacement (b) calculated by springback analysis by replacing the residual stress in the area (No. 15).
Figure 26:
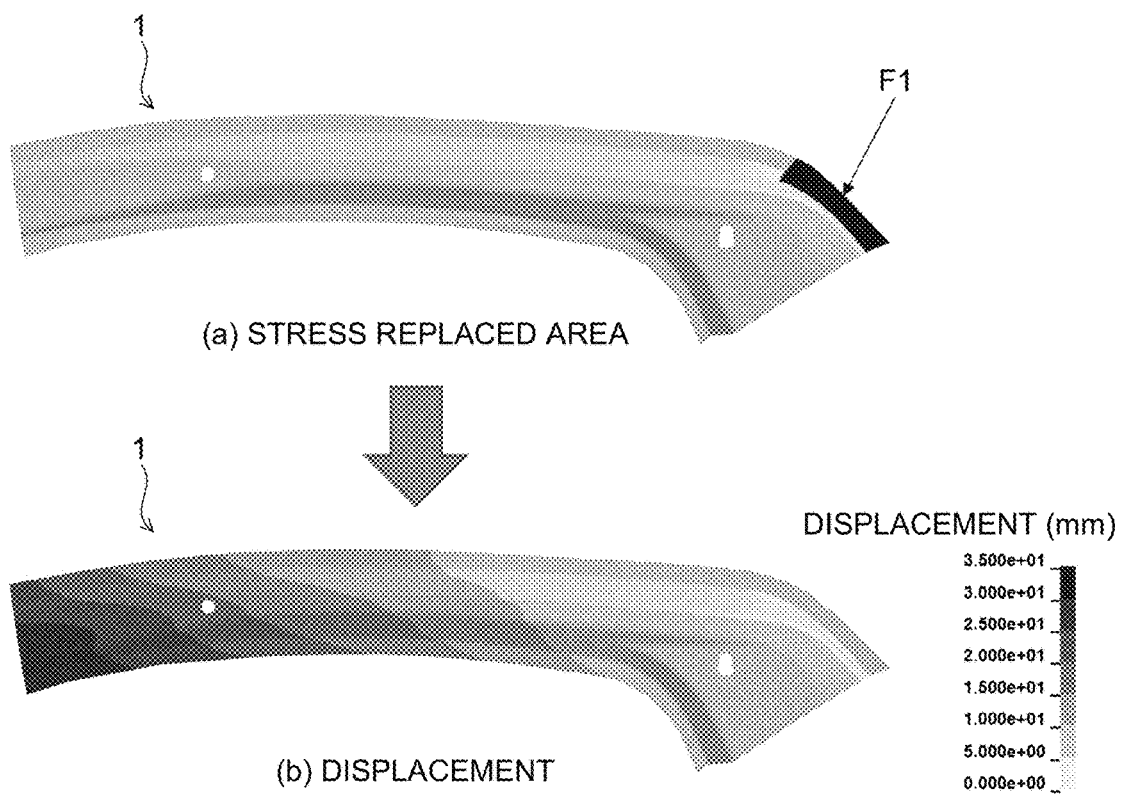
FIG. 26 is a diagram illustrating, in the first embodiment, an area (a) in which residual stress is replaced and displacement (b) calculated by springback analysis by replacing the residual stress in the area (No. 16).
Figure 27:
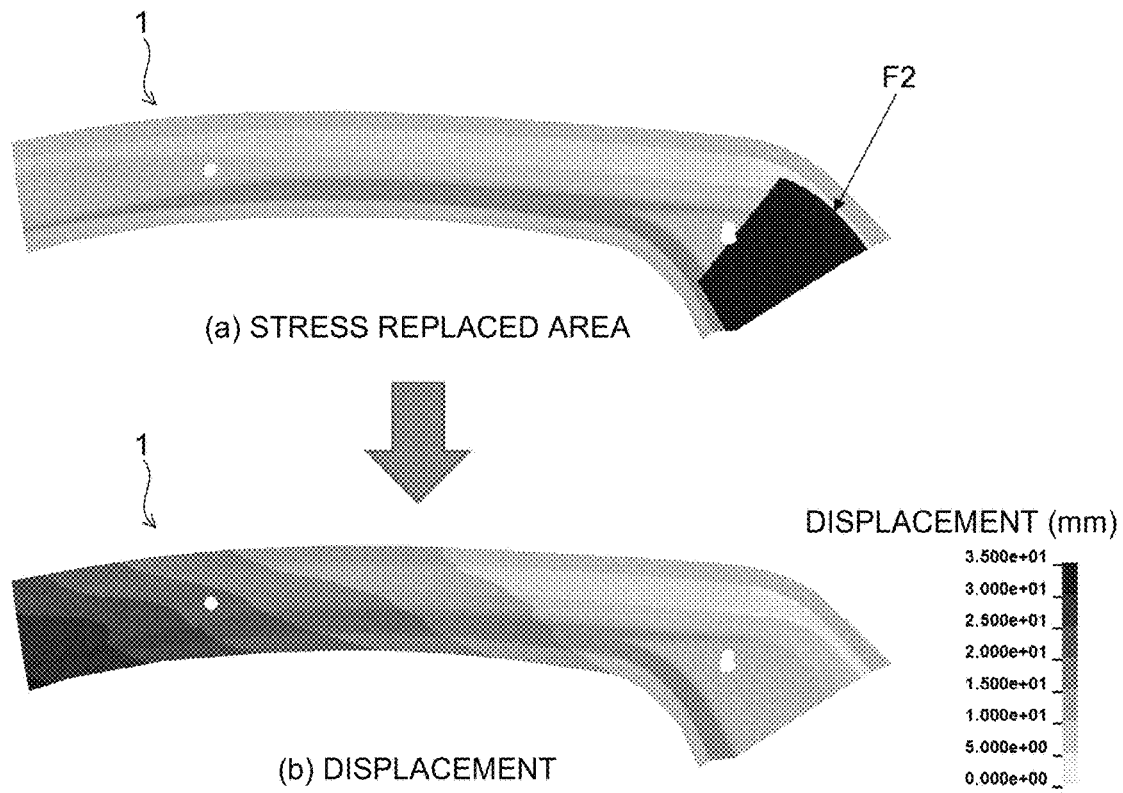
FIG. 27 is a diagram illustrating, in the first embodiment, an area (a) in which residual stress is replaced and displacement (b) calculated by springback analysis by replacing the residual stress in the area (No. 17).
Figure 28:
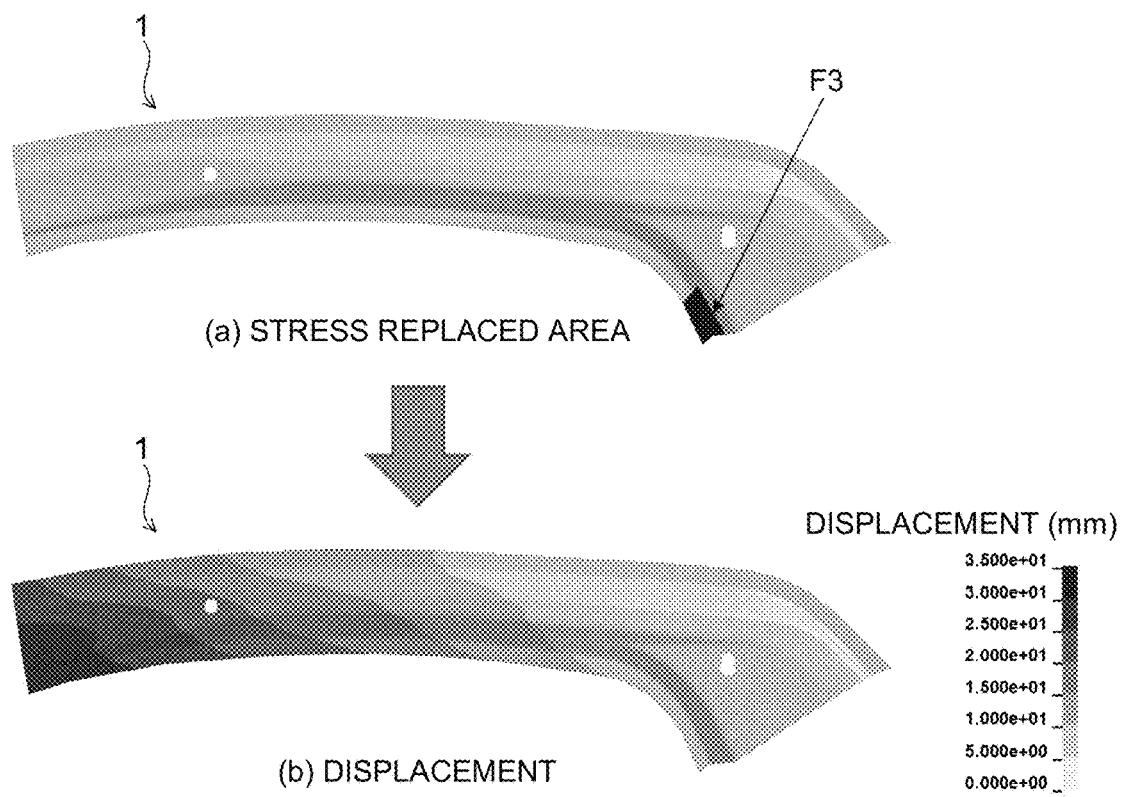
FIG. 28 is a diagram illustrating, in the first embodiment, an area (a) in which residual stress is replaced and displacement (b) calculated by springback analysis by replacing the residual stress in the area (No. 18).

In the stress replaced springback amount calculation step S9, springback amount is calculated in accordance with a procedure similar to that of the above-mentioned first springback amount calculation step S3. First, in the first embodiment, springback analysis on the press formed part 1 (FIG. 10(a)) for which the value of the residual stress in the partial area of the residual stress distribution has been replaced at the stress replacement step S7 is performed, and displacement caused by springback is calculated (FIG. 10(b)). FIGS. 11 to FIGS. 28 illustrate the results of displacement calculated by performing springback analysis on the press formed part 1 by replacing the value of the residual stress in the areas (A1, A2, A3, . . . , F3) of the residual stress distribution in the press formed part 1.

Next, the torsion angle (FIG. 7(a)) and the amount of bending (FIG. 7(b)) are calculated as springback amount based on the displacement calculated by performing springback analysis for each case where the value of the residual stress in the areas (A1, A2, A3, . . . , F3) of the residual stress distribution in the press formed part 1 has been replaced.

<Springback Amount Variation Factor Portion Identifying Step>

The springback amount variation factor portion identifying step S11 is a step for obtaining a difference between the springback amount calculated at the stress replaced springback amount calculation step S9 and the springback amount calculated at the first springback amount calculation step S3, and identifying a portion in the press formed part 1 that is a factor for variation in springback amount of the press formed part 1 due to scattering in press forming conditions based on the obtained difference.

In the first embodiment, the springback amount calculated at the stress replaced springback amount calculation step S9 is set to the springback amount calculated for the press formed part 1 (FIG. 8(c)) for which the value of the residual stress in a partial area $R_A$ of the residual stress distribution (FIG. 8(a)) at the press forming bottom dead center in the case of using the material I as the first press forming conditions is replaced with the value of the residual stress in an area $R_B$ corresponding to the partial area $R_A$ of the residual stress distribution (FIG. 8(b)) at the press forming bottom dead center in the case of using the material II as the second press forming conditions.

Meanwhile, the springback amount calculated at the first springback amount calculation step S3 is set to the springback amount calculated for the press formed part 1 for which the residual stress distribution calculated at the first residual stress distribution calculation step S1 has been set.

Then, a portion that is a factor for variation in springback amount of the press formed part 1 due to scattering in press forming conditions is identified based on the difference in springback amount calculated in this manner.

In the first embodiment, a portion that is a factor for variation in torsion angle and amount of bending was identified as springback amount.

Figure 29:
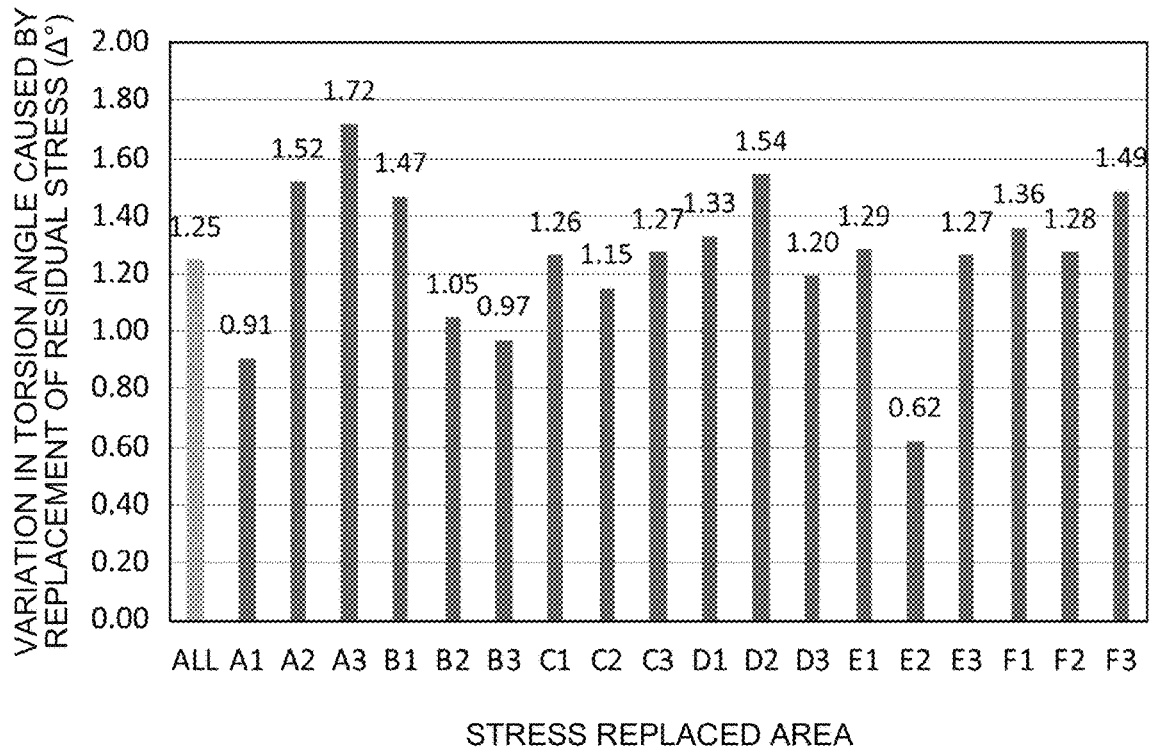
FIG. 29 is a graph illustrating a relation between areas in the press formed part in which residual stress was replaced and variation in torsion angle caused by springback when the residual stress was replaced in the first embodiment (No. 1).

FIG. 29 illustrates an example of a result of acquiring variation in torsion angle, which is difference between the torsion angle of the press formed part 1 calculated at the stress replaced springback amount calculation step S9 and the torsion angle of the press formed part 1 calculated at the first springback amount calculation step S3.

"ALL" in the horizontal axis of the graph illustrated in FIG. 29 indicates variation in torsion angle, which is difference between the torsion angle calculated by replacing the residual stress distribution in all the areas at the press forming bottom dead center at the time of using the material I with the residual stress distribution at the press forming bottom dead center at the time of using the material II, and the torsion angle calculated by the residual stress distribution at the press forming bottom dead center at the time of using the material I. Furthermore, A1 to F3 in the horizontal axis of the graph illustrated in FIG. 29 indicate variation in torsion angle, which is difference between the torsion angle calculated by replacing the residual stress distribution in all the areas at the press forming bottom dead center at the time of using the material I with the residual stress distribution at the press forming bottom dead center at the time of using the material II, and the torsion angle calculated by replacing the values of the residual stresses in the areas (A1 to F3) illustrated in FIG. 9 of the residual stress distribution at the press forming bottom dead center at the time of using the material I with values of residual stresses in areas corresponding to the areas (A1 to F3) of the residual stress distribution at the press forming bottom dead center at the time of using the material II.

From FIG. 29, in the case where the residual stresses of all the areas of the press formed part 1 were replaced ("ALL"), the variation in torsion angle was 1.25°, but the variations in torsion angle in the case where the residual stresses of the partial areas A1, B3, and E2 of the press formed part 1 were replaced were 0.91°, 0.97°, and 0.62°, respectively, which were lower than "ALL". The fact that the torsion angle was reduced by replacing the residual stress in a partial area of the press formed part 1 indicates that the area has a great influence on the variation in torsion angle, and hence the areas are areas that increase the torsion angle in press forming of the material I. That is, the fact that the springback amount was reduced by replacing the residual stress in a partial area at the time of using the material I with the residual stress in a partial area at the time of using the material II indicates that the partial area increased springback at the time of using the material I. Thus, on the basis of the result of FIG. 29, the areas A1, B3, and E2 can be identified as portions that cause variation in torsion angle due to scattering in material strength of the blank material.

Furthermore, on the basis of the result of FIG. 29, it is understood that there is an area in which the torsion angle increases or hardly changes when the residual stress in a partial area of the press formed part 1 is replaced.

For example, the variation in torsion angle was 1.72° when the residual stress in the area A3 of the press formed part 1 was replaced, which increased as compared with the variation (1.25° of "ALL") in torsion angle in the case where all the residual stresses were replaced, resulting in increase in torsion angle. This indicates that the area A3 is a portion that increases variation in torsion angle due to scattering in material strength of the blank material by replacing the residual stress in the area A3.

It is suggested that when such a portion is identified as a portion in which variation occurs in springback due to scattering in press forming conditions and some countermeasures are taken to change the residual stress at the press forming bottom dead center of the portion and perform press forming, the portion is a portion in which variation in springback due to scattering in press forming conditions increases further. The variation in torsion angle, that is, increase of difference in torsion angle indicates that springback amount before replacement of the residual stress increases through replacement of the residual stress, which degrades springback. Thus, an area (area A3 of press formed part 1) in which variation in torsion angle increases through replacement of the residual stress is not a portion that is a factor for variation in springback due to scattering in material strength of the blank material.

Furthermore, it is indicated that areas (for example, C1, C3, E3) with the same degree as the variation (1.25° of "ALL") in torsion angle, in the case where the residual stresses of all the areas were replaced in FIG. 29, are portions in which the influence on the variation in torsion angle due to scattering in material strength of the blank material is small.

That is, it is suggested that even when such a region is identified as a portion in which variation occurs in springback due to scattering in press forming conditions and some countermeasures are taken to change the residual stress at the press forming bottom dead center of the portion and perform press forming, variation in springback due to scattering in press forming conditions does not change. Thus, in the present invention, in the case where the variation in torsion angle at the time of replacing the residual stress in a partial area is the same degree as that of the case of replacing the residual stresses of all the areas, the partial area is not a portion that is a factor for variation in torsion angle due to scattering in material strength of the blank material.

In this manner, in the case where the value of the residual stress in a partial area of the residual stress distribution in the press formed part 1 is replaced and the torsion angle is reduced more as compared with the case of replacing the residual stresses of all the areas, the area is identified as a portion that is a factor for variation in springback due to scattering in press forming conditions.

Figure 30:
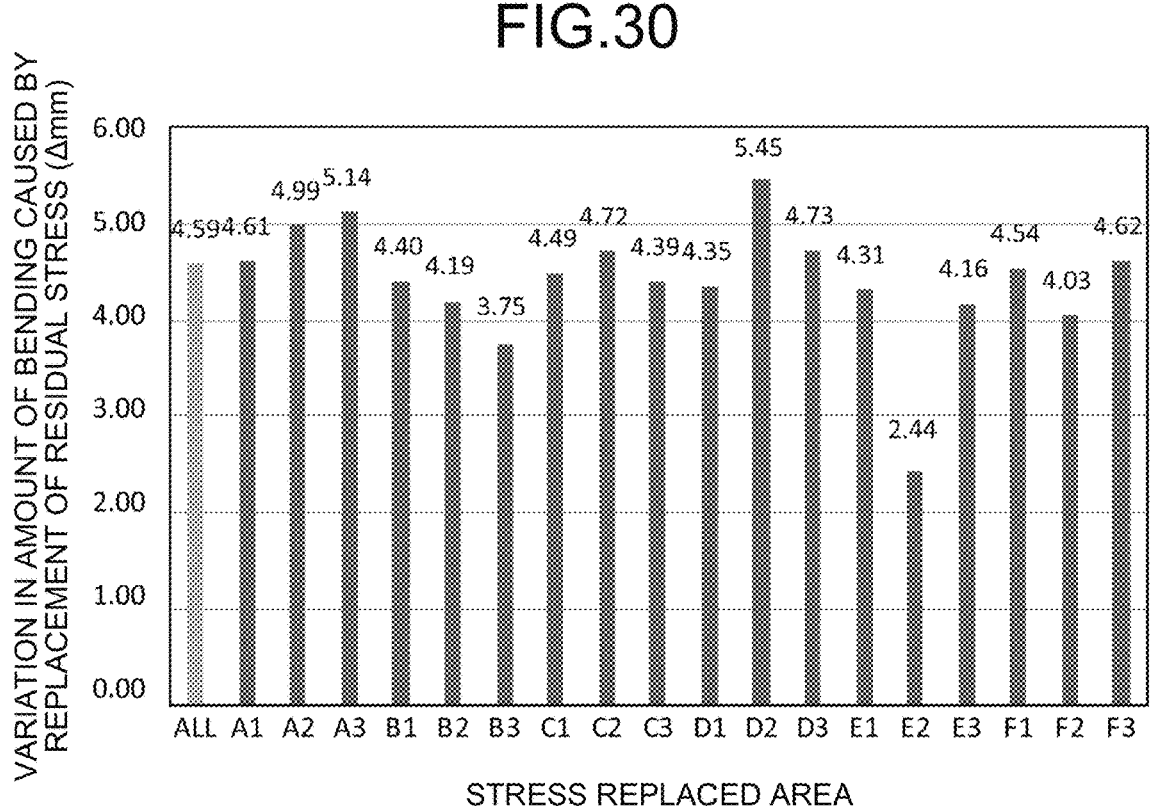
FIG. 30 is a graph illustrating a relation between areas in which residual stress was replaced and variation in amount of bending caused by springback when the residual stress was replaced in the first embodiment.

Next, description is given of the case of identifying a portion that is a factor for variation in amount of bending as springback amount of the press formed part 1 due to scattering in press forming conditions. FIG. 30 illustrates an example of a result of calculating variation in amount of bending, which is difference between the amount of bending of the press formed part 1 calculated at the stress replaced springback amount calculation step S9 and the amount of bending of the press formed part 1 calculated at the first springback amount calculation step S3.

Similarly to FIG. 29, "ALL" in the horizontal axis of the graph illustrated in FIG. 30 indicates variation in amount of bending, which is difference between the amount of bending calculated by replacing the residual stress distribution in all the areas at the time of using the material I with the residual stress distribution at the time of using the material II, and the amount of bending calculated by the residual stress distribution at the time of using the material I. Furthermore, A1 to F3 in the horizontal axis of the graph illustrated in FIG. 30 indicate variation in amount of bending, which is difference between the amount of bending calculated by replacing the residual stress distribution in all the areas at the time of using the material I with the residual stress distribution at the time of using the material II, and the amount of bending calculated by replacing the values of residual stresses in the areas (A1 to F3) illustrated in FIG. 9 of the residual stress distribution at the time of using the material I with values of residual stresses in areas corresponding to the areas (A1 to F3) of the residual stress distribution at the time of using the material II.

From FIG. 30, in the case where the residual stresses of all the areas were replaced ("ALL"), the variation in amount of bending due to scattering in material strength of the blank material was 4.59 mm, but the variations in amount of bending in the case where the residual stresses of the areas B3 and E2 were replaced were 3.75 mm and 2.44 mm, respectively, which were lower than "ALL". That is, similarly to the case of the torsion angle, the fact that the springback amount was reduced by replacing the residual stress in a partial area at the time of using the material I with the residual stress in an area corresponding to the partial area at the time of using the material II indicates that the partial area increased springback at the time of using the material I. Thus, the areas B3 and E2 can be identified as portions that cause the variation in amount of bending due to scattering in material strength.

On the other hand, as compared with the case of replacing all the residual stresses ("ALL"), it is indicated that areas (for example, A2, A3, and D2) for which the variation in amount of bending increased in the case of replacing the residual stress, or other areas (for example, A1, F1, F3) for which the variation in amount of bending hardly changed are areas in which the amount of bending increases or hardly changes through replacement of the residual stresses of the areas. Thus, similarly to the result (FIG. 29) of the variation in torsion angle described above, these areas are not to be identified as portions that are factors for variation in springback.

According to the results illustrated in FIG. 29 and FIG. 30, the portion identified as a factor for variation in springback amount due to scattering in material strength does not necessarily match a portion identified as a factor for the generation of springback itself by the conventional technology as described above. This point is described by comparison with the results of identifying a factor for generation of springback by the conventional technology.

Figure 31:
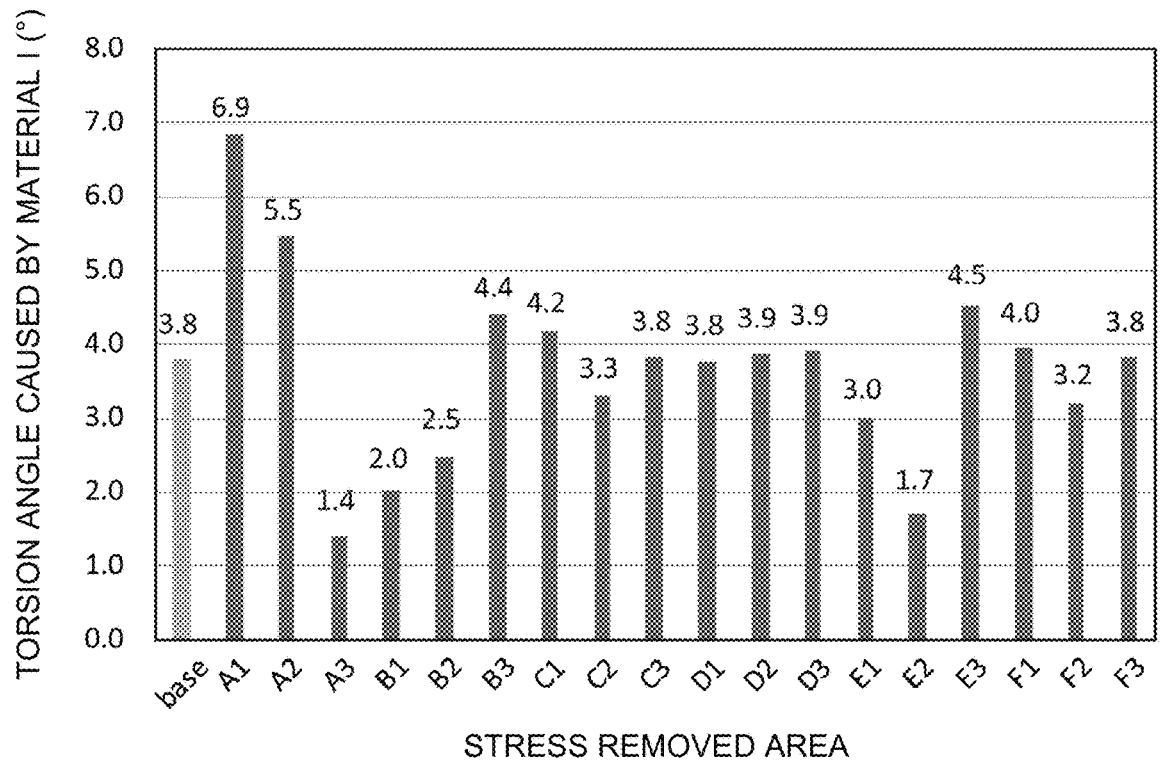
FIG. 31 is a graph illustrating, as an example of a result of identifying a portion that is a factor for generation of springback by conventional technology, a relation between areas in which residual stress distribution at the press forming bottom dead center was changed and torsion angles caused by springback when the residual stress was changed.

FIG. 31 illustrates, as an example of a result of identifying a portion that is a factor for generation of springback by conventional technology, the result of using the conventional technology (method disclosed in Patent Literature 2) to determine a relation between areas in which residual stress distribution at the press forming bottom dead center was changed and torsion angles caused by springback when the residual stress distribution was changed. FIG. 31 illustrates the results of the torsion angle in the case where the residual stress distribution at the press forming bottom dead center was not changed ("base") and the torsion angles calculated by performing springback analysis by removing the residual stresses in the areas A1 to F3 illustrated in FIG. 9.

From FIG. 31, a portion that is a factor for generation of springback (torsion angle) can be identified as an area for which springback is reduced by removing the residual stress of the area, and as a portion that corresponds to the areas A3, B1, B2, and E2 having large difference with the torsion angle in the case of "base". However, as illustrated in FIG. 29, the portion identified in this manner exhibited a tendency different from that of a portion that is a factor for variation in torsion angle due to scattering in material strength, resulting in unmatched cases. Therefore, it is understood that the conventional method for identifying a portion that is a factor for generation of springback cannot accurately identify a portion that is a factor for variation in springback amount due to scattering in press forming conditions.

Furthermore, Patent Literature 5 described above discloses a technology of calculating difference in residual stress of a plurality of areas based on the residual stress distribution at the press forming bottom dead center under the first press forming conditions in the areas and the residual stress distribution at the press forming bottom dead center under the second press forming conditions different from the first press forming conditions, performing processing of calculating, for an area for which the finite difference is larger than a predetermined value, the residual stress in a partial area under the first press forming conditions of an area having the large difference in residual stress, and calculating springback amount. Furthermore, Patent Literature 5 discloses replacement of the residual stress to any value as an example of performing the processing of calculating the residual stress.

However, Patent Literature 5 relates to a technology of calculating difference in residual stress between the first press forming conditions and the second press forming conditions, and identifying an area having the large finite difference. Furthermore, in Patent Literature 5, the residual stress under the first press forming conditions is replaced with an arbitrary value at the time of the processing of calculating the residual stress, and how to set the arbitrary value for replacement is not indicated at all. Thus, the present invention calculating difference in springback amount and identifying only the area for which the difference decreases, and the technology according to Patent Literature 5 calculating difference in residual stress and identifying an area having the large difference have totally different technical ideas and effects to be obtained.

As described above, it is indicated that the springback amount variation factor portion identifying method according to the first embodiment can identify a portion that is a factor of variation in springback amount due to scattering in press forming conditions accurately and simply.

In the description given above, the material I illustrated in Table 1 is set to be the first press forming conditions, and the material II is set to be the second press forming conditions. However, the material II may be set to be the first press forming conditions, and the material I may be set to be the second press forming conditions. The first press forming conditions and the second press forming conditions may be selected in any manner.

The signs of variation in torsion angle of FIG. 29 and variation in springback amount indicated by the variation in amount of bending illustrated in FIG. 30 may change depending on the manner of selection of the first and second press forming conditions. To identify a portion that is a factor for variation in springback, an area for which the absolute value of variation in springback amount decreases due to replacement of the value of the residual stress may be identified as a portion that is a factor for variation in springback due to scattering in press forming conditions.

Second Embodiment

Figure 32:
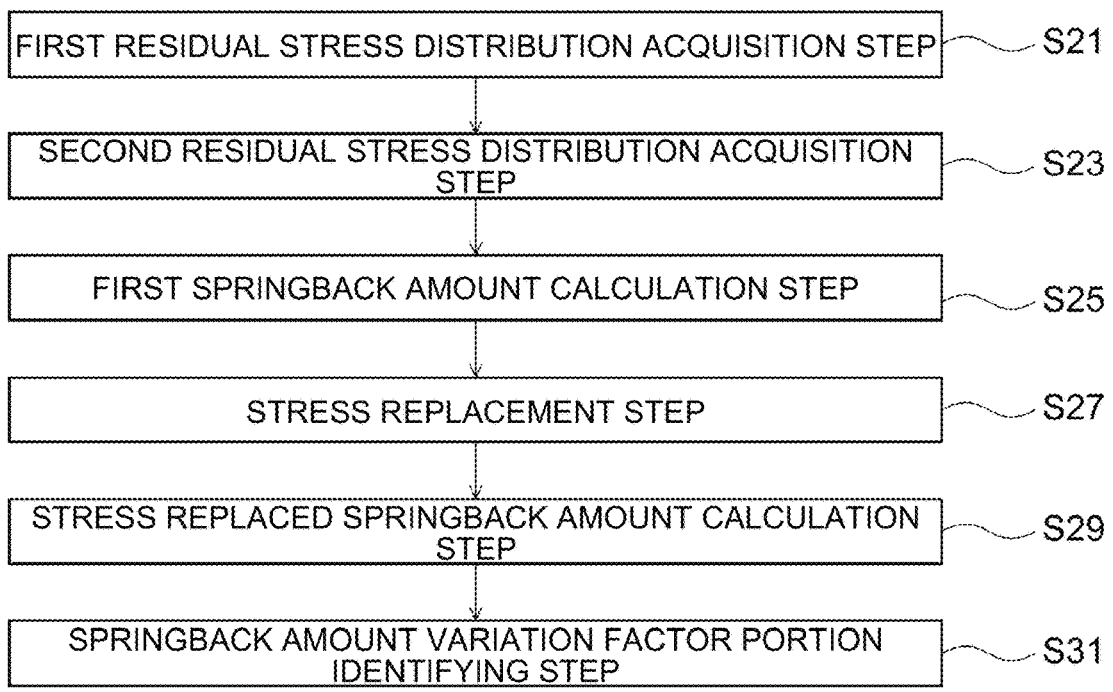
FIG. 32 is a flowchart illustrating the flow of processing in a springback amount variation factor portion identifying method according to a second embodiment of the present invention.

A springback amount variation factor portion identifying method according to a second embodiment of the present invention identifies, when variation occurs in springback amount of a press formed part due to scattering in press forming conditions, a portion in the press formed part that is a factor for variation in springback amount, and includes, as illustrated in FIG. 32, a first residual stress distribution acquisition step S21, a second residual stress distribution acquisition step S23, a first springback amount calculation step S25, a stress replacement step S27, a stress replaced springback amount calculation step S29, and a springback amount variation factor portion identifying step S31. Now, description is given of each step described above with reference to FIG. 32 and FIG. 33.

<First Residual Stress Distribution Acquisition Step S21>

The first residual stress distribution acquisition step S21 is a step for press forming a first press formed part under first press forming conditions in advance, creating a first press formed part model from three-dimensional shape measurement data obtained by measuring the surface shape of the first press formed part after die release, performing mechanical analysis in the state in which the first press formed part model is sandwiched by a tool-of-press-forming model until reaching a press forming bottom dead center, and acquiring residual stress distribution in the first press formed part at the press forming bottom dead center.

Figure 33:
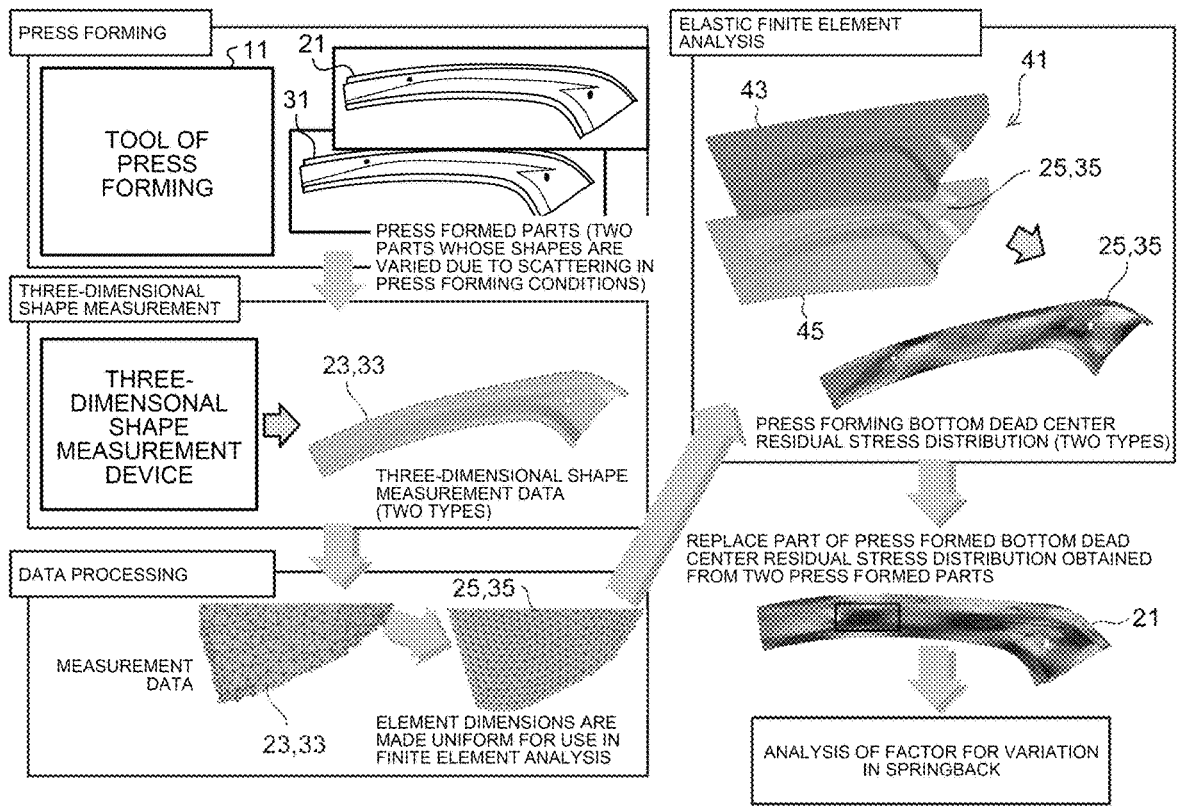
FIG. 33 is a diagram for describing the processing in the springback amount variation factor portion identifying method according to the second embodiment.

Specific processing at the first residual stress distribution acquisition step S21 corresponds to, as illustrated in FIG. 33, a process for press forming a first press formed part 21 under first press forming conditions by using a tool of press forming 11, measuring the three-dimensional shape of the press-formed first press formed part 21, processing first press formed part three-dimensional shape data 23, which is the measured three-dimensional shape measurement data, to create a first press formed part model 25, performing elastic finite element analysis as mechanical analysis in the state in which the first press formed part model 25 is sandwiched by a tool-of-press-forming model 41 formed from a die 43 and a punch 45 until reaching the press forming bottom dead center, and acquiring residual stress distribution in the first press formed part model 25 at the press forming bottom dead center obtained by the elastic finite element analysis.

As specific methods for the measurement of the three-dimensional shape of the first press formed part 21 press formed under the first press forming conditions, the creation of the first press formed part model 25, and the elastic finite element analysis, for example, the methods described in Patent Literature 7 can be used.

<Second Residual Stress Distribution Acquisition Step S23>

The second residual stress distribution acquisition step S23 is a step for press forming a second press formed part under second press forming conditions different from the first press forming conditions within a range of scattering in press forming conditions in advance, creating a second press formed part model from three-dimensional shape measurement data obtained by measuring the surface shape of the second press formed part after die release, performing mechanical analysis in the state in which the second press formed part model is sandwiched by the tool-of-press-forming model until reaching the press forming bottom dead center, and acquiring residual stress distribution in the second press formed part at the press forming bottom dead center.

Specific processing at the second residual stress distribution acquisition step S23 also corresponds to, as illustrated in FIG. 33, a process for press forming a second press formed part 31 under second press forming conditions by using the tool of press forming 11, measuring the three-dimensional shape of the press-formed second press formed part 31, processing second press formed part three-dimensional shape data 33, which is the measured three-dimensional shape measurement data, to create a second press formed part model 35, performing elastic finite element analysis as mechanical analysis in the state in which the second press formed part model 35 is sandwiched by the tool-of-press-forming model 41 formed from the die 43 and the punch 45 until reaching the press forming bottom dead center, and acquiring residual stress distribution in the second press formed part model 35, which is obtained by the elastic finite element analysis, at the press forming bottom dead center. As specific methods for the measurement of the three-dimensional shape of the second press formed part 31 press formed under the second press forming conditions, the creation of the second press formed part model 35, and the elastic finite element analysis, for example, the methods described in Patent Literature 7 can also be used.

<First Springback Amount Calculation Step>

The first springback amount calculation step S25 is a step for performing springback analysis on the first press formed part 21 for which the residual stress distribution acquired at the first residual stress distribution acquisition step S21 has been set, and calculating springback amount such as a torsion angle or an amount of bending.

In the second embodiment, springback amount was calculated in accordance with the following procedure. First, springback analysis was performed for the first press formed part 21 for which the residual stress distribution acquired at the first residual stress distribution acquisition step S21 has been set, and displacement caused by springback was calculated. In springback analysis, similarly to the press formed part 1 illustrated in FIG. 6 of the first embodiment described above, three locations provided on one end side of the first press formed part 21 were fixed, and displacement caused by springback was calculated.

Next, a torsion angle (FIG. 7(a)) and an amount of bending (FIG. 7(b)) were calculated as springback amount based on the calculated displacement caused by springback. As illustrated in FIG. 7(a), the torsion angle was a rotation angle (positive in arrow direction in FIG. 7(a)) caused by torsion in a straight line connecting evaluation points at two locations provided on the other end side of the first press formed part 21. As illustrated in FIG. 7(b), the amount of bending was displacement (positive in direction away from the punch 7) in a press forming stroke direction at a midpoint between the two evaluation points.

Furthermore, at the first springback amount calculation step S25, a computer performs the springback analysis. For the springback analysis, for example, finite element analysis software can be used. In the second embodiment, LS-DYNA Ver.971, which is commercially available finite element analysis software, was executed on the computer to perform the springback analysis, and a static implicit method was applied to a solver.

<Stress Replacement Step S27>

The stress replacement step S27 is a step for replacing the value of the residual stress in a partial area of the residual stress distribution in the first press formed part 21 at the press forming bottom dead center acquired at the first residual stress distribution acquisition step S21 with the value of the residual stress in an area corresponding to the partial area of the residual stress distribution in the second press formed part 31 at the press forming bottom dead center acquired at the second residual stress distribution acquisition step S23.

Figure 8:
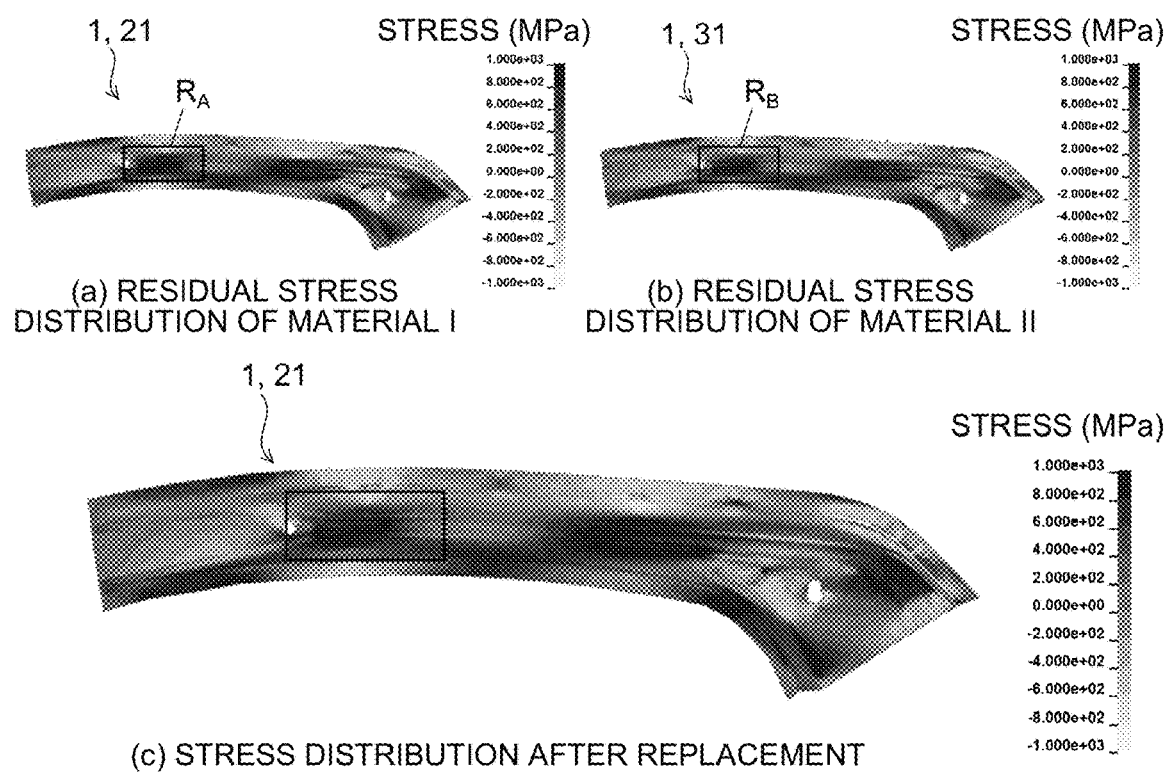
FIG. 8 is a diagram illustrating, in the first embodiment, residual stress distribution (a) at the press forming bottom dead center under the press forming conditions of the material I, residual stress distribution (b) at the press forming bottom dead center under the press forming conditions of the material II, and stress distribution (c) in which the value of the residual stress in a partial area of the residual stress distribution at the press forming bottom dead center of the material I is replaced with the value of the residual stress in an area corresponding to the partial area of the residual stress distribution at the press forming bottom dead center of the material II.

In the second embodiment, as illustrated in FIG. 8, the value of the residual stress in a partial area $R_A$ of the residual stress distribution in the first press formed part 21 at the press forming bottom dead center in the case of press forming using the material I as the first press forming conditions is replaced with the value of the residual stress in an area $R_B$ corresponding to the partial area $R_A$ of the residual stress distribution in the second press formed part 31 at the press forming bottom dead center in the case of press forming using the material II as the second press forming conditions.

Furthermore, the first press formed part 21 can be divided into a plurality of areas, namely, into six of A to F in longitudinal direction and into three of 1 to 3 in width direction, as illustrated in FIG. 9, for example, and any one of the areas (A1, A2, A3, . . . , F3) can be selected as the partial area in the first press formed part 21 for which the value of the residual stress is replaced or the partial area of the second press formed part 31 corresponding thereto. Regarding the value of the residual stress for replacement, the value of the residual stress in the partial area $R_A$ in the first press formed part 21 is not necessarily required to be set to be equal to the value of the residual stress in the partial area $R_B$ in the second press formed part 31, and the value may be changed based on the residual stress before or after replacement.

<Stress Replaced Springback Amount Calculation Step>

The stress replaced springback amount calculation step S29 is a step for performing springback analysis on the first press formed part 21 for which the value of the residual stress in the partial area of the residual stress distribution was replaced at the stress replacement step S27, and calculating springback amount.

In the stress replaced springback amount calculation step S29, springback amount can be calculated in accordance with a procedure similar to that of the above-mentioned first springback amount calculation step S25.

First, springback analysis on the first press formed part 21 for which the value of the residual stress in the partial area of the residual stress distribution has been replaced at the stress replacement step S27 is performed, and displacement caused by springback is calculated.

Next, a torsion angle (FIG. 7(a)) and an amount of bending (FIG. 7(b)) are calculated based on the displacement caused by springback calculated by performing springback analysis for each case where the value of the residual stress in the areas (A1, A2, A3, . . . , F3) of the residual stress distribution in the first press formed part 21 has been replaced.

At the stress replaced springback amount calculation step S29, a computer performs the springback analysis. For the springback analysis, for example, finite element analysis software can be used. In the second embodiment, LS-DYNA Ver.971, which is commercially available finite element analysis software, was executed on the computer to perform the springback analysis, and a static implicit method was applied to a solver.

<Springback Amount Variation Factor Portion Identifying Step>

The springback amount variation factor portion identifying step S31 is a step for obtaining difference between the springback amount calculated at the stress replaced springback amount calculation step S29 and the springback amount calculated at the first springback amount calculation step S25, and identifying a portion in the first press formed part 21 that is a factor for variation in springback amount of the first press formed part 21 due to scattering in press forming conditions based on the obtained difference.

A portion that is a factor for variation in springback amount can be identified in accordance with a procedure similar to that of the springback amount variation factor portion identifying step S11 according to the first embodiment described above.

The springback amount calculated at the stress replaced springback amount calculation step S29 is springback amount calculated for the first press formed part 21 for which the value of the residual stress in a partial area of the residual stress distribution at the press forming bottom dead center at the time of using the material I as the first press forming conditions has been replaced with the value of the residual stress in an area corresponding to the partial area of the residual stress distribution at the press forming bottom dead center at the time of using the material II as the second press forming conditions. Meanwhile, the springback amount calculated at the first springback amount calculation step S25 is springback amount calculated for the first press formed part 21 (refer to FIG. 33) for which the residual stress distribution acquired at the first residual stress distribution acquisition step S21 has been set.

Furthermore, difference between the springback amount calculated by replacing the residual stress distribution in all the areas at the time of press forming under the first press forming conditions with the residual stress distribution at the time of press forming under the second press forming conditions and performing springback analysis, and the springback amount calculated by setting the residual stress distribution at the time of press forming under the first press forming conditions and performing springback analysis.

Then, in the case where the value of the residual stress in a partial area of the residual stress distribution is replaced and the difference in springback amount is reduced more as compared with the difference in springback amount in the case of replacing all the areas of the residual stress distribution, the area for which the value of the residual stress has been replaced is identified as a portion that is a factor for variation in springback amount due to scattering in press forming conditions.

In contrast, when the difference in springback amount at the time of replacing the value of the residual stress in a partial area of the residual stress distribution has increased or has not changed as compared with the difference in springback amount at the time of replacing all the areas of the residual stress-distribution, the area for which the value of the residual stress has been replaced is not identified as a portion that is a factor for variation in springback amount due to scattering in press forming conditions.

As described above, it is found that the method according to the second embodiment can accurately identify a portion that is a factor of variation in springback amount due to scattering in press forming conditions.

The method for acquiring a measured shape of the press formed part, performing mechanical analysis of sandwiching by the tool-of-press-forming model based on the acquired measured shape, and calculating a residual stress distribution at the press forming bottom dead center is disclosed in Patent Literature 7. However, unlike the method according to the second embodiment described above, acquisition of a finite difference between residual stress distributions at the press forming bottom dead center of two press formed parts press formed under the two press forming conditions, and evaluation of variation in springback amount due to scattering in press forming conditions based on the finite difference between residual stress distributions are not disclosed or suggested in Patent Literature 7.

Furthermore, the press forming conditions that cause scattering in the first embodiment and the second embodiment are any one of mechanical properties of a blank material (blank), the thickness and shape of the blank material, the temperature of the blank material, sliding characteristics between the blank material and a tool of press forming, the relative position of the blank material with respect to the tool of press forming, the position and shape of a positioning device for the blank material, mechanical properties of the material of the tool of the press forming, the shape of the surface of the tool of press forming, the internal structure of the tool of press forming, blank holder force, blank holder position, the position and shape of a device for applying blank holder force to component parts of the tool of press forming, the initial relative position of the component parts of the tool of press forming, the relative speed of movement of the tool of press forming, the vibration of the tool of press forming, the temperature of the tool of press forming, atmospheric temperature, atmospheric components, a pressurizing device, and electromagnetic environments.

Furthermore, the stress replacement step S7 in the first embodiment and the stress replacement step S27 in the second embodiment replace the residual stress of at least a partial area of the residual stress distribution. However, the method for replacing the residual stress is not limited thereto, and the value of the residual stress may be replaced by any one of methods for replacing the component in at least one direction for the residual stress, multiplying the difference in residual stress before or after replacement by a constant value, adding a constant value to the value, raising the value to the power of a constant value, replacing the value with an average value in a plate thickness direction of the blank material, and replacing the value with a median value in the plate thickness direction. Furthermore, the area for which the value of the residual stress is replaced is not limited to one area, and the values of residual stresses in a plurality of areas may be replaced at the same time.

EXAMPLE

Specific experiments for confirming the actions and effects of the springback amount variation factor portion identifying method according to the present invention were performed. The results are described below. In the present example, a portion that is a factor for variation in springback amount due to scattering in press forming conditions was identified for three cases where the shape of the tool of press forming, the lubricating state, and the press forming bottom dead center position vary as scattering in press forming conditions. The press forming conditions and the analysis results in the cases are described below.

In the present example, the method according to the above-mentioned first embodiment was used. Specifically, as illustrated in FIG. 2, press forming analysis in which the tool-of-press-forming model 3 formed from the die 5 and the punch 7 was used to press form the blank 9 into the press formed part 1 and springback analysis on the press formed part 1 for which residual stress distribution at the press forming bottom dead center determined by the press forming analysis had been set were performed. A portion that is a factor for variation in springback amount was identified by dividing the press formed part 1 into a plurality of areas (A1 to F3) as illustrated in FIG. 9, performing springback analysis on the press formed part 1 for which the value of the residual stress in the areas had been replaced (replaced with the value for each corresponding finite element), and acquiring the relation between the area in which the value of the residual stress had been replaced and the variation in springback amount at the time of replacing the value of the residual stress. The press forming analysis and the springback analysis were performed by executing LS-DYNA Ver.971 as finite element analysis software on a computer.

[Shape of Tool of Press Forming]

A case where the tool of press forming is worn due to continuous press forming and the shape of the tool of press forming changes as scattering in press forming conditions was assumed, and a portion as a factor for variation in springback amount in the press formed part due to scattering in the shape of the tool of press forming was identified.

Scattering among shapes of the tool of press forming means the case where the curvature radii of ridgelines of the die 5 and the punch 7 increase due to wear of the tool of press forming during mass production. Two conditions were set: a condition in which the curvature radii of all ridgelines of the die 5 and the punch 7 in the tool-of-press-forming model 3 remain unchanged from the design shape (hereinafter referred to as "tool of press forming I") and a condition in which the curvature radii are increased by 2 mm (hereinafter referred to as "tool of press forming II"). The curvature radius of 2 mm was set as a value larger than actual variation. Press forming analysis was performed on the shape of each tool of press forming, and the residual stress distribution at the press forming bottom dead center was calculated. Next, the press formed part 1 was divided into a plurality of areas (A1 to F3) as illustrated in FIG. 9 and the value of the residual stress in the areas was replaced to identify a portion that is a factor for variation in springback amount based on the relation between each area and the variation in springback amount due to replacement of the value of the residual stress. On the assumption that the press forming conditions (such as an amount of lubricant and a press forming bottom dead center position) other than the shape of the tool of press forming were not changed, the frictional coefficient between the blank 9 and the tool-of-press-forming model 3 was set to 0.15, and the press forming bottom dead center position was set such that the gap between the die 5 and the punch 7 was 1.45 mm.

Figure 34:
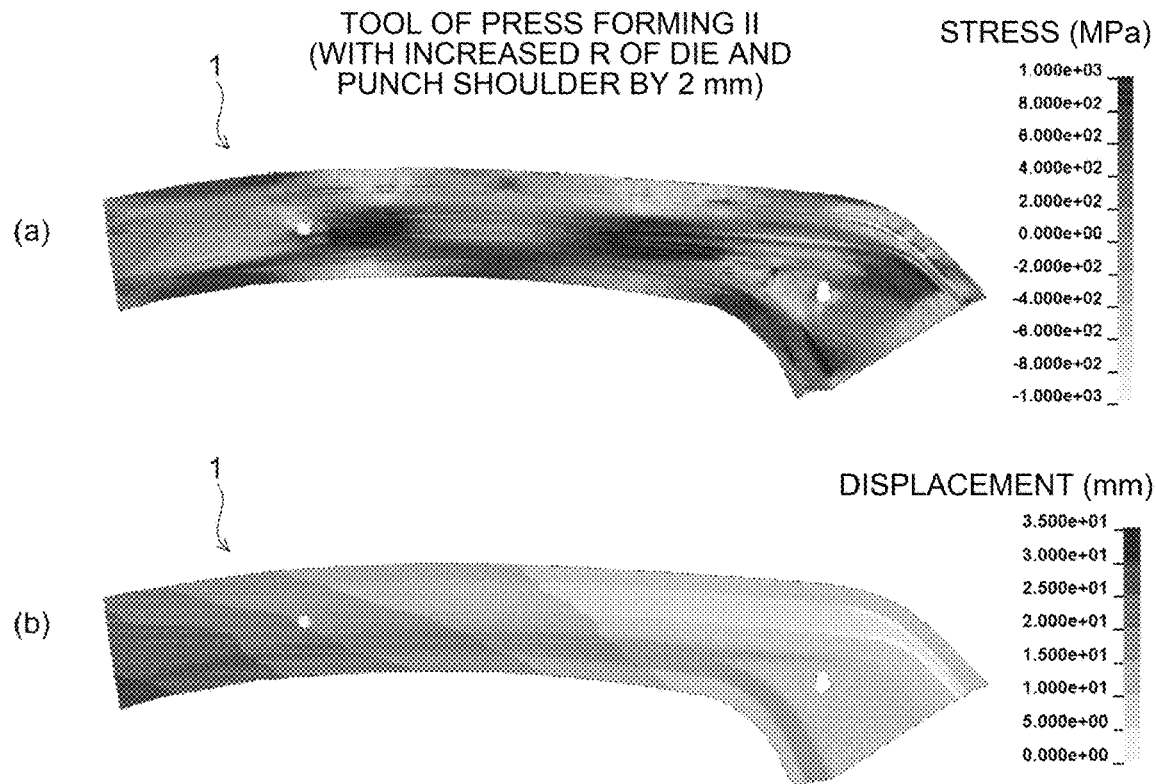
FIG. 34 is a diagram illustrating, in an example, residual stress distribution (a) at the press forming bottom dead center calculated by press forming analysis under press forming conditions (tool of press forming II) in which the shape of a tool of press forming was different and displacement (b) calculated by springback analysis based on the residual stress distribution.

FIG. 34 illustrate residual stress distribution (a) at the press forming bottom dead center calculated by press forming analysis under the press forming conditions of the tool of press forming II, and displacement (b) in the press formed part 1 calculated by springback analysis based on the residual stress distribution. The residual stress distribution at the press forming bottom dead center calculated by press forming analysis under the press forming conditions of the tool of press forming I and the displacement in the press formed part 1 calculated by springback analysis are the same as the results illustrated in FIG. 3.

Figure 35:
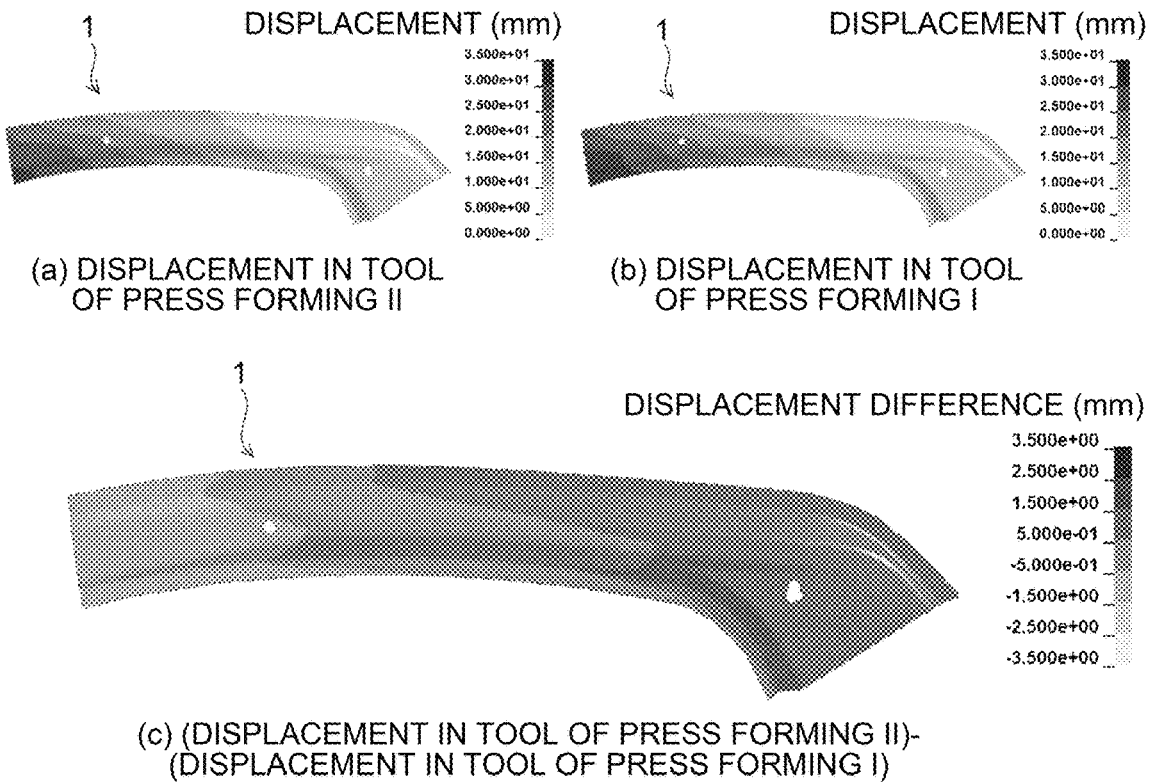
FIG. 35 is a diagram illustrating displacements (a) and (b) calculated by springback analysis under press forming conditions in which the shape of a tool of press forming was different and difference (c) between the displacements caused by springback under the different press forming conditions.

FIG. 35 illustrate displacement (a) caused by springback under the press forming conditions of the tool of press forming II, displacement (b) caused by springback under the press forming conditions of the tool of press forming I, and difference (c) between the displacements caused by springback under the different press forming conditions of the tool of press forming II and the tool of press forming I. From FIG. 35, it is understood that variation in springback has occurred due to scattering among the shapes of the tools of press forming.

Figure 36:
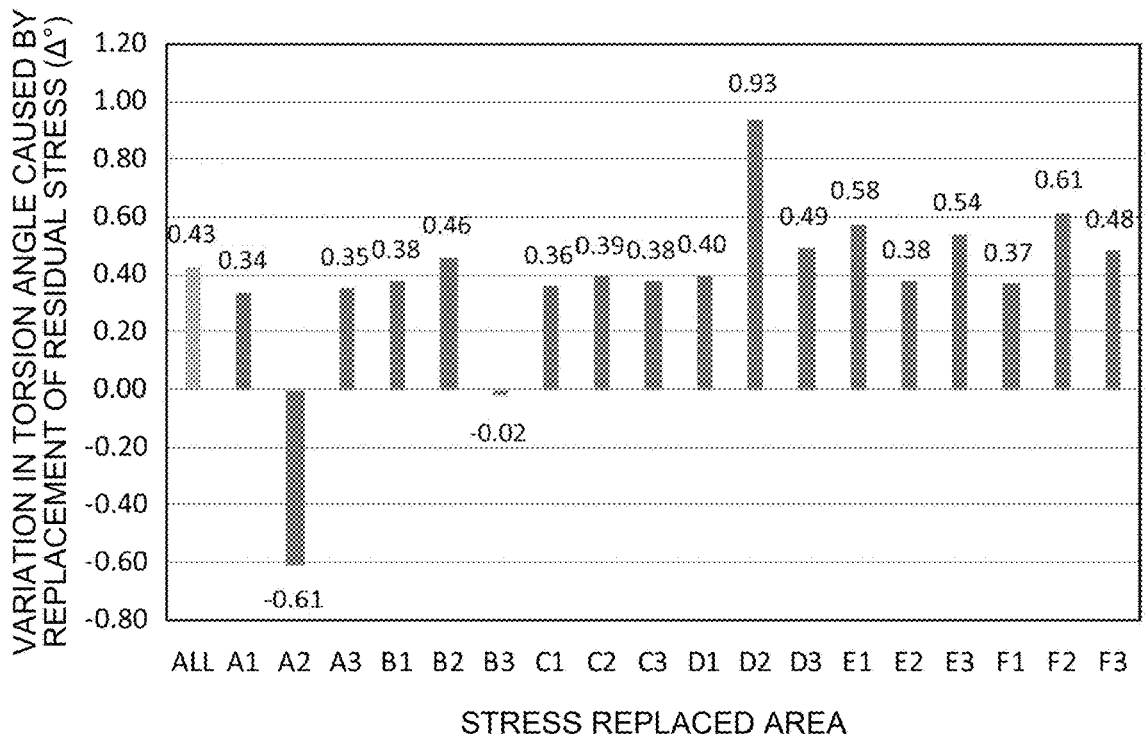
FIG. 36 is a graph illustrating, in the example, a relation between areas in which residual stress was replaced and variation in torsion angle caused by springback when the residual stress was replaced in the case where there was scattering among the shapes of tools of press forming.
Figure 37:
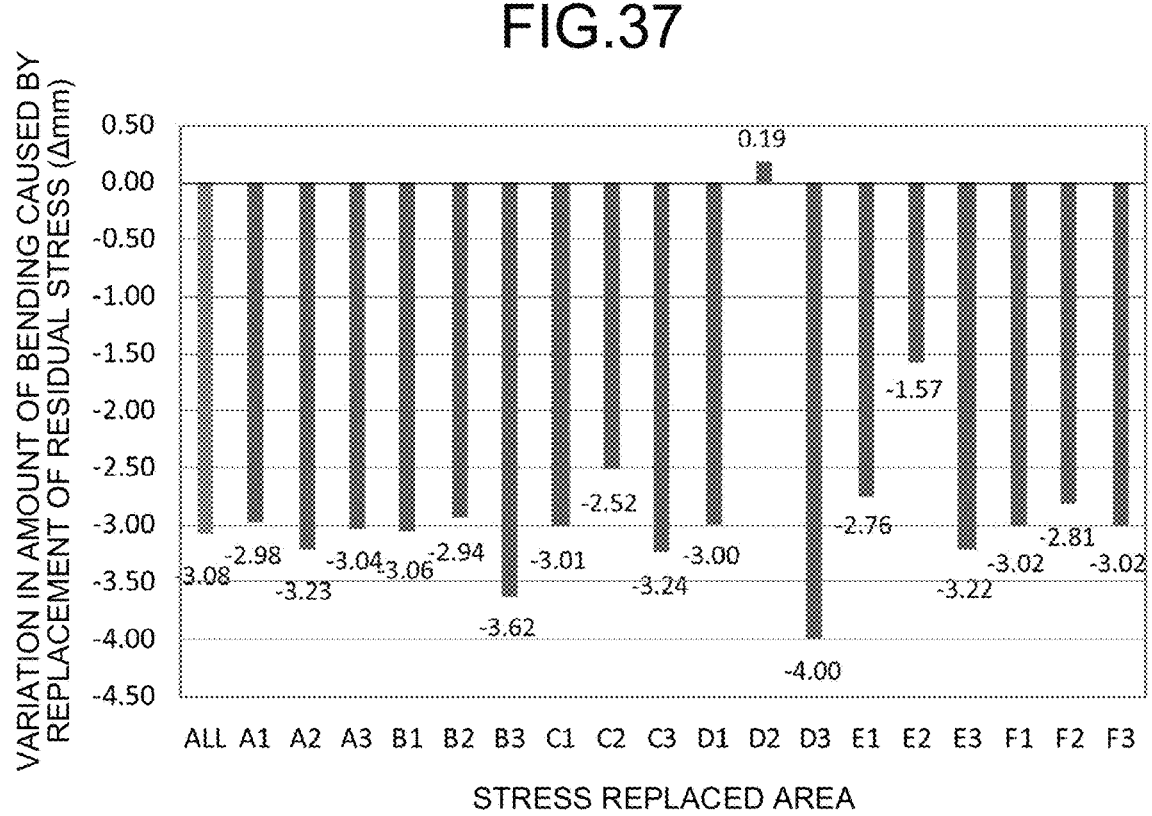
FIG. 37 is a graph illustrating, in the example, a relation between areas in which residual stress was replaced and variation in amount of bending caused by springback when the residual stress was replaced in the case where there was scattering among the shapes of tools of press forming.

Next, FIG. 36 and FIG. 37 illustrate results of acquiring the variation in torsion angle and the variation in amount of bending as the variation in springback amount by using the displacement calculated by performing springback analysis based on the stress distribution for which the residual stress has been replaced. In FIG. 36 and FIG. 37, "ALL" indicates the variation in springback amount calculated at the stress replaced springback amount calculation step S9 by replacing the values of the residual stresses in all the areas of the press formed part 1 at the time of press forming under the condition of the tool of press forming I with the values of the residual stresses at the time of press forming under the condition of the tool of press forming II, and A1 to F3 indicate the variation in springback amount calculated by replacing the residual stress in each of the areas A1 to F3 illustrated in FIG. 9.

From FIG. 36, it is understood that, when the value of the residual stress in the area B3 is replaced, the variation in torsion angle is greatly reduced to −0.02° as compared with 0.43° ("ALL"), which is the variation in torsion angle at the time of replacing all the residual stresses. Thus, the area B3 is identified as a portion that is a factor for variation in torsion angle due to scattering among the shapes of the tools of press forming.

From FIG. 37, it is understood that, when the residual stress in each of the areas D2 and E2 is replaced, the variations in amount of bending are changed to 0.19 mm and −1.57 mm, respectively, as compared with −3.08 mm ("ALL"), which is the variation in amount of bending at the time of replacing all the residual stresses, and their absolute values are greatly reduced. Thus, the areas D2 and E2 are identified as portions that are factors for variation in amount of bending due to scattering among the shapes of the tools of press forming.

As described above, when scattering occurs in shape of the tool of press forming as press forming conditions, portions that are factors for variation in torsion angle and amount of bending as springback amount due to scattering in the shape of the tool of press forming can be identified. By changing to a part shape or a method that less causes variation in residual stress in each area identified as a result of these, a press formed part in which less occurrence of shape variation due to scattering in press forming conditions can be obtained.

[Lubricating State]

Next, a case where lubricating conditions (such as amount of adhesion of lubricant) during press forming change as scattering in press forming conditions was assumed, and a portion as a factor for variation in springback amount due to scattering in lubricating conditions was identified.

In the present example, in regard to scattering in lubricating conditions, in consideration of the friction coefficient of the tool-of-press-forming model 3 (die 5 and punch 7) and the blank 9 in press forming analysis, press forming analysis was performed under press forming conditions in which the friction coefficient was 0.15 (hereinafter referred to as "lubricant I") and press forming conditions in which the friction coefficient was 0.20 (hereinafter referred to as "lubricant II"), and residual stress distribution at the press forming bottom dead center was calculated to identify a portion as a factor for variation in springback amount.

In regard to the identifying of a portion in which variation occurs in springback amount due to scattering in lubricating conditions, the method described in the first embodiment was used, and the press forming bottom dead center position was set such that the gap between the die 5 and the punch 7 in the tool-of-press-forming model 3 was 1.45 mm on the assumption that the press forming conditions (such as a shape of tool of press forming and a press forming bottom dead center position) other than the lubricating conditions were not changed.

By dividing the press formed part 1 into a plurality of areas (A1 to F3) as illustrated in FIG. 9 and replacing the values of the residual stress in each area, a portion that is a factor for variation in springback amount due to scattering in lubricating conditions was identified based on the relation between the areas and the springback amount.

Figure 38:
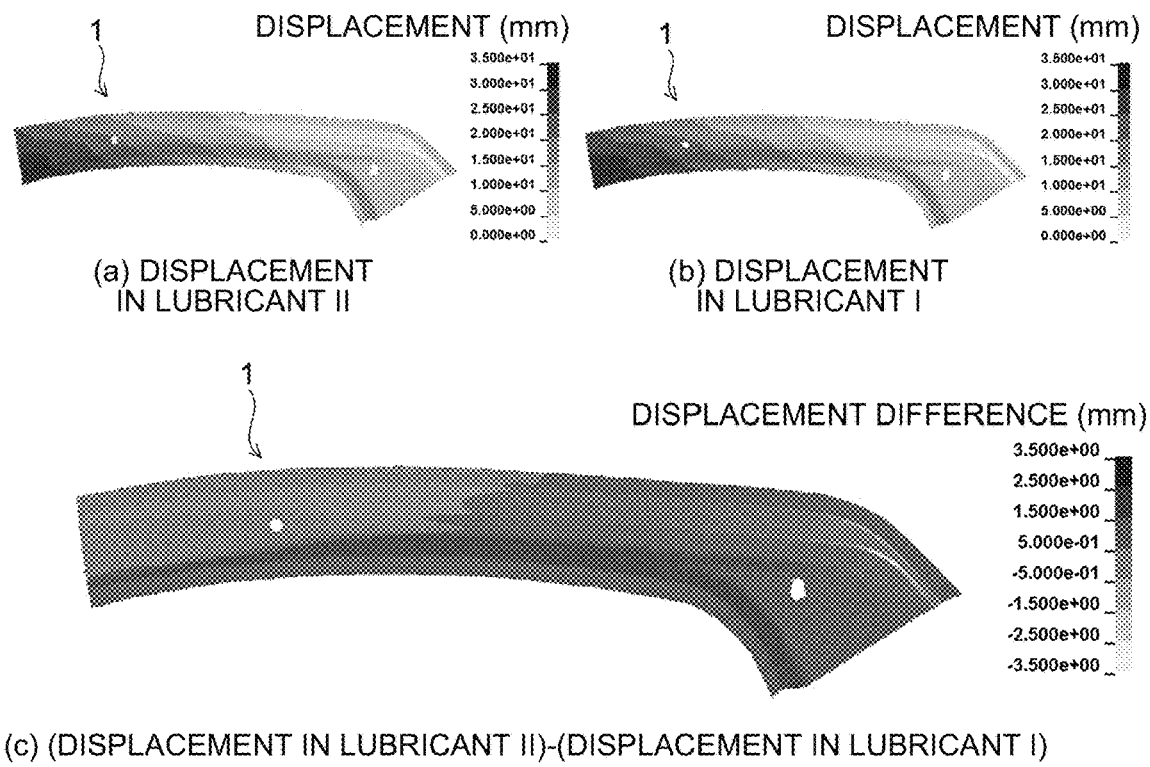
FIG. 38 is a diagram illustrating, in the example, displacements (a) and (b) calculated by springback analysis under different press forming conditions in which there was scattering in lubricating conditions and difference (c) between the displacements caused by springback under the different press forming conditions.

FIG. 38 illustrate displacement (a) caused by springback under the press forming condition of lubricant II, displacement (b) caused by springback under the press forming condition of lubricant I, and difference (c) between the displacements caused by springback due to scattering in press forming conditions of the lubricant II and the lubricant I. From FIGS. 38, it is understood that variation in springback has occurred due to scattering in lubricating conditions.

Figure 39:
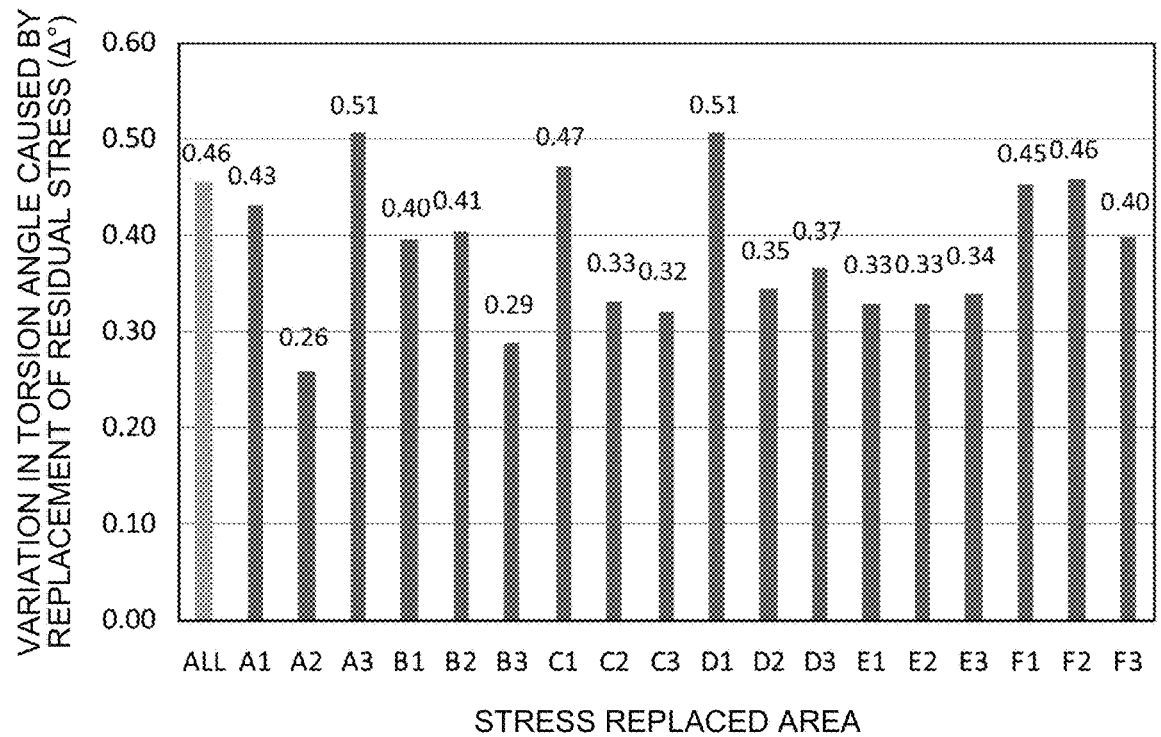
FIG. 39 is a graph illustrating, in the example, a relation between areas in which residual stress was replaced and variation in torsion angle caused by springback when the residual stress was replaced in the case where there was scattering in lubricating conditions.
Figure 40:
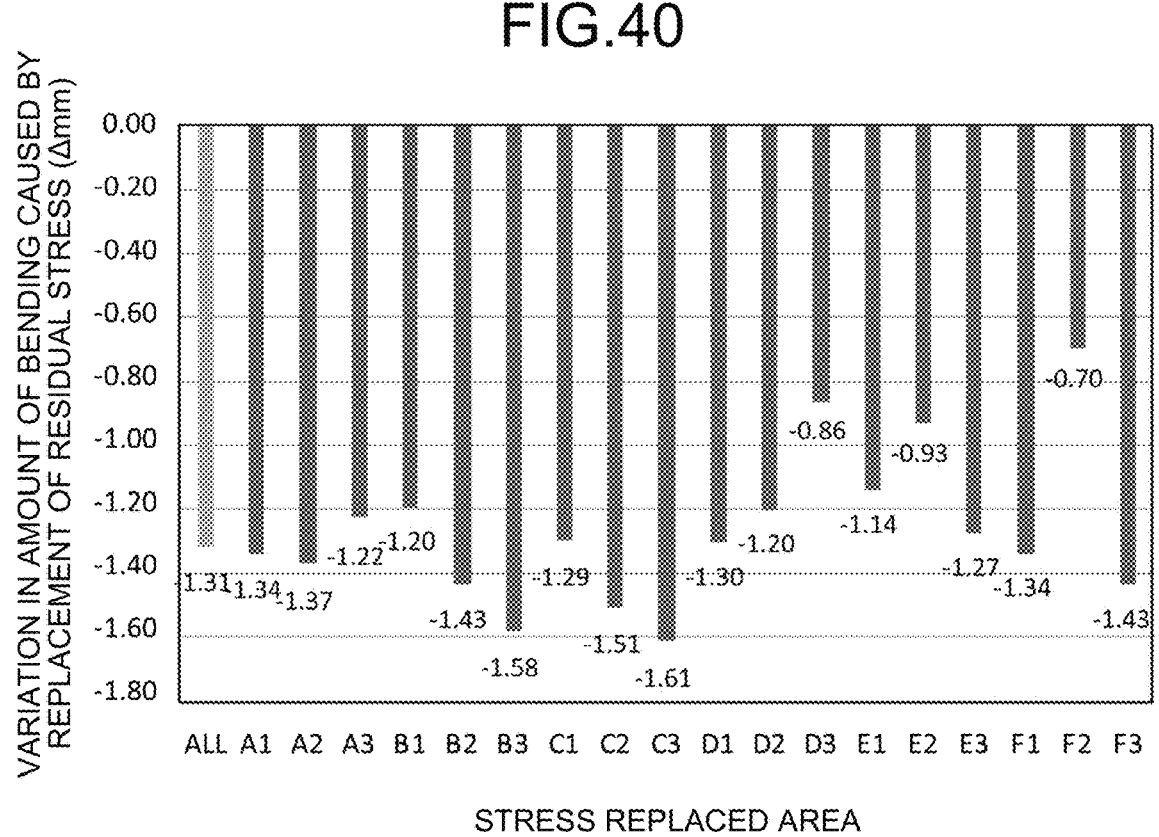
FIG. 40 is a graph illustrating, in the example, a relation between areas in which residual stress was replaced and variation in amount of bending caused by springback when the residual stress was replaced in the case where there was scattering in lubricating conditions.

Next, FIG. 39 and FIG. 40 illustrate results of acquiring the variation in torsion angle and the variation in amount of bending as the variation in springback amount by using the displacement calculated by performing springback analysis based on the stress distribution for which the residual stress has been replaced.

In FIG. 39 and FIG. 40, "ALL" indicates the variation in springback amount calculated at the stress replaced springback amount calculation step S9 by replacing the residual stresses in all the areas, and A1 to F3 indicate the variation in springback amount calculated at the stress replaced springback amount calculation step S9 by replacing the residual stresses in the areas A1 to F3 illustrated in FIG. 9.

From FIG. 39, it is understood that, when the residual stress in each of the areas A2 and B3 is replaced, the variations in torsion angle are reduced to 0.26° and 0.29°, respectively, as compared with 0.46° ("ALL"), which is the variation in torsion angle at the time of replacing all the residual stresses. Thus, the areas A2 and B3 are identified as portions that are factors for variation in torsion angle.

From FIG. 40, it is understood that, when the residual stress in each of the areas D3, E2, and F2 is replaced, the absolute values of the variations in amount of bending are reduced to −0.86 mm, −0.93 mm, and −0.70 mm, respectively, as compared with −1.31 mm ("ALL"), which is the variation in amount of bending at the time of replacing all the residual stresses. Thus, the areas D3, E2, and F2 are identified as portions that are factors for variation in amount of bending.

As described above, even when scattering occurs in lubricating conditions as press forming conditions, portions that are factors for variation in torsion angle and amount of bending as springback amount due to scattering in the lubricating conditions can be identified.

[Position of Press Forming Bottom Dead Center]

Furthermore, a case where the press machine press forming state during press forming changes as scattering in press forming conditions was assumed, and a portion as a factor for variation in springback amount due to scattering in press machine press forming state was identified.

In the present example, in regard to scattering in press machine press forming state, in consideration of the position of the press forming bottom dead center by press forming analysis, press forming analysis was performed under press forming conditions where the gap between the die 5 and the punch 7 in the tool-of-press-forming model 3 was 1.45 mm (hereinafter referred to as "bottom dead center I") and press forming conditions where the gap between the die 5 and the punch 7 increased by 0.2 mm to be 1.65 mm (hereinafter referred to as "bottom dead center II"), and the residual stress distribution in press forming bottom dead center was calculated to identify a portion that was a factor for variation in springback amount. The fact that scattering occurs in how the tool of press forming and the blank contact and the forming load due to scattering in press forming bottom dead center position can be simulated.

In regard to the identifying of a portion in which variation occurs in springback amount due to scattering in position of press forming bottom dead center, the method described in the first embodiment was used, and the frictional coefficient between the blank 9 and the tool-of-press-forming model 3 was set to 0.15 on the assumption that the press forming conditions (such as shape of tool of press forming and amount of lubricant (frictional coefficient)) other than the press forming bottom dead center position were not changed.

Then, as illustrated in FIG. 9, the press formed part 1 was divided into a plurality of areas (A1 to F3), and the value of the residual stress in each area was replaced to identify a portion that is a factor for variation in springback amount due to scattering in position of the press forming bottom dead center based on the relation between each area and springback amount.

Figure 41:
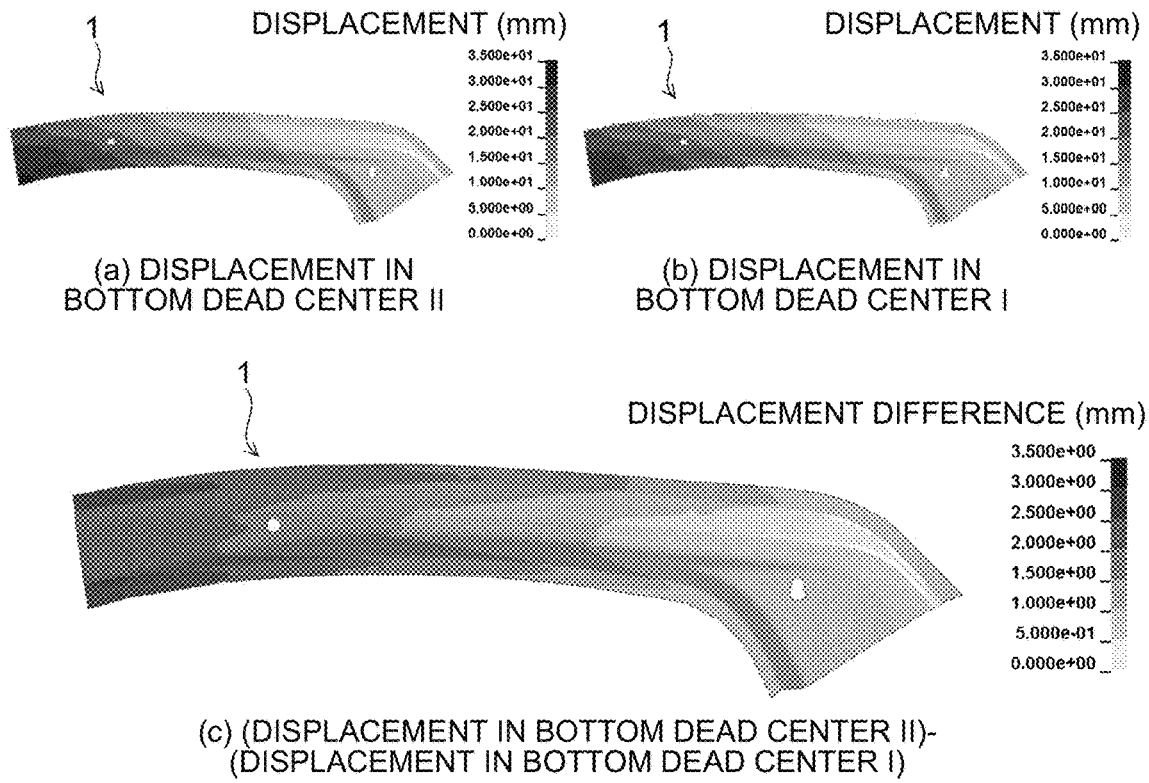
FIG. 41 is a diagram illustrating displacements (a) and (b) calculated by springback analysis under different press forming conditions in which there was scattering in position of the press forming bottom dead center and difference (c) between the displacements caused by springback under the different press forming conditions.

FIG. 41 illustrate displacement (a) caused by springback under the press forming condition of a bottom dead center II, displacement (b) caused by springback under the press forming condition of a bottom dead center I, and difference (c) between the displacements caused by springback due to scattering in press forming conditions of the bottom dead center II and the bottom dead center I.

From FIG. 41, it is understood that variation in springback has occurred due to scattering in position of the press forming bottom dead center.

Figure 42:
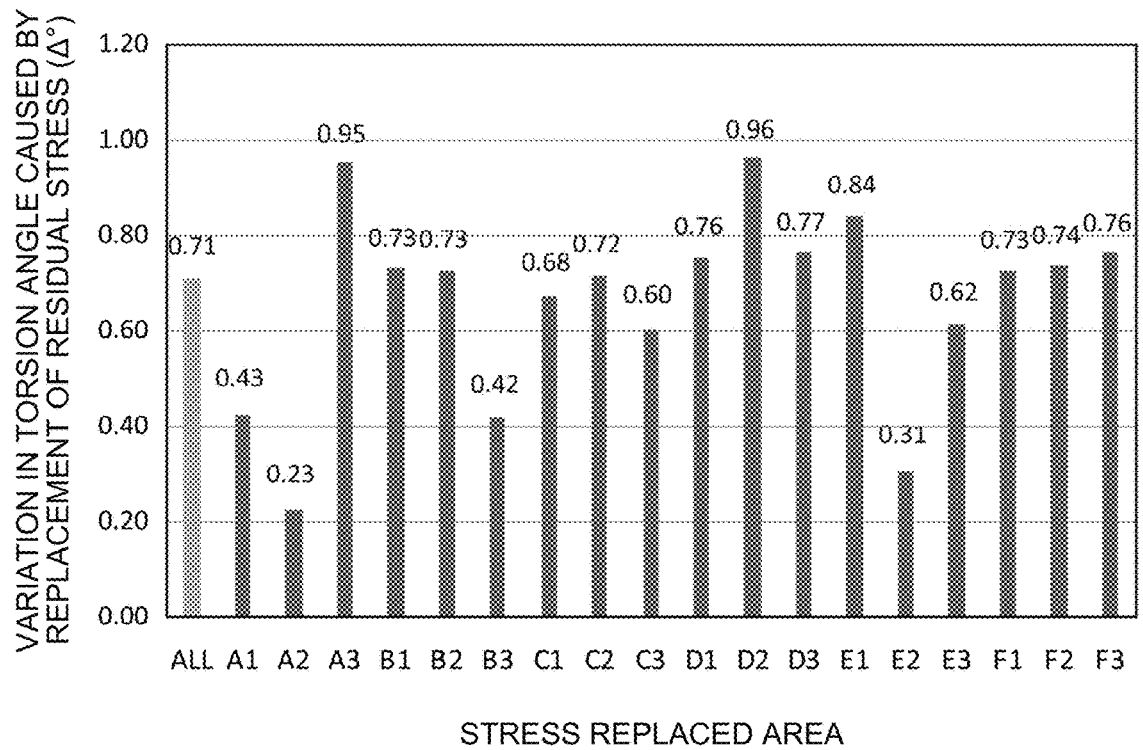
FIG. 42 is a graph illustrating, in the example, a relation between areas in which residual stress was replaced and variation in torsion angle caused by springback when the residual stress was replaced in the case where there was scattering in position of the press forming bottom dead center.
Figure 43:
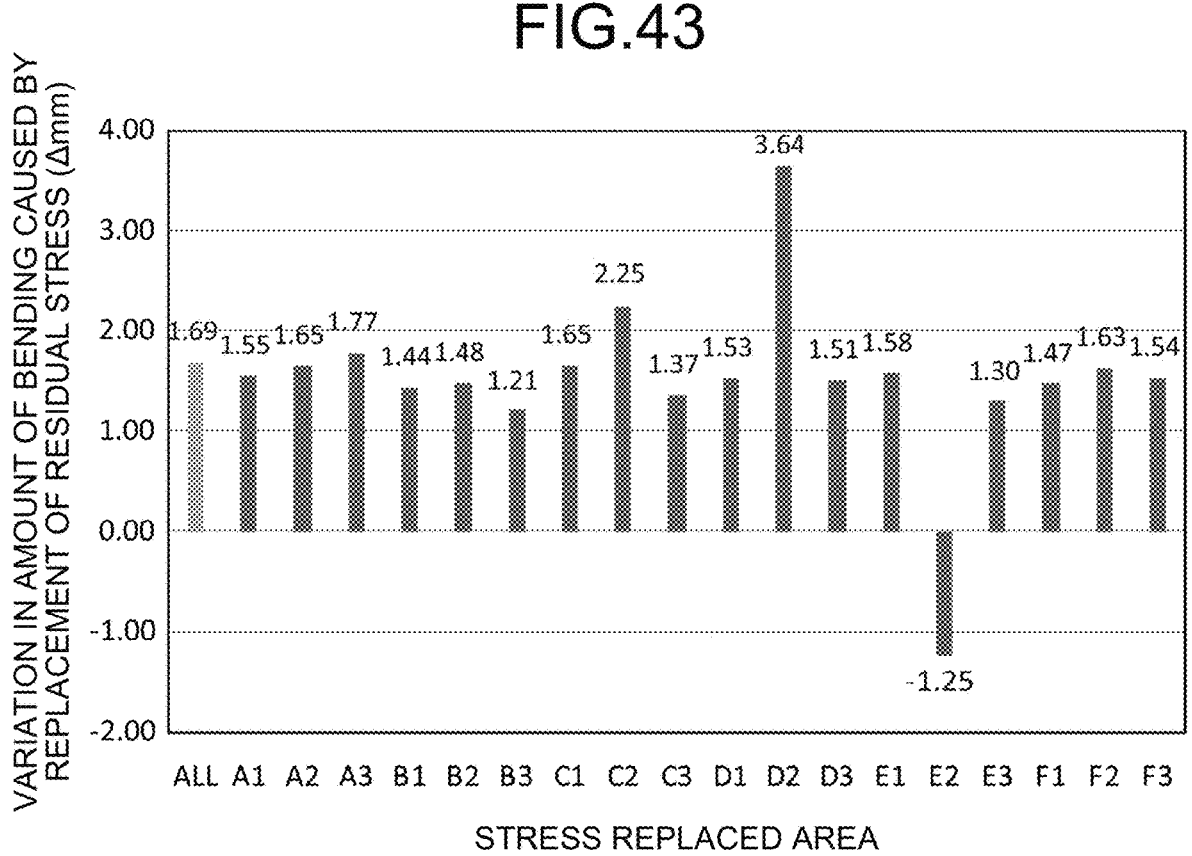
FIG. 43 is a graph illustrating, in the example, a relation between areas in which residual stress was replaced and variation in amount of bending caused by springback when the residual stress was replaced in the case where there was scattering in position of the press forming bottom dead center.

Next, FIG. 42 and FIG. 43 illustrate results of acquiring the variation in torsion angle and the variation in amount of bending as the variation in springback amount by using the displacement calculated by replacing the residual stress and performing springback analysis. In FIG. 42 and FIG. 43, "ALL" indicates the variation in springback amount calculated at the stress replaced springback amount calculation step S29 by replacing all the residual stresses, and A1 to F3 indicate the variation in springback amount calculated at the stress replaced springback amount calculation step S29 by replacing the residual stresses in the areas A1 to F3 illustrated in FIG. 9.

From FIG. 42, it is understood that, when the residual stress in each of the areas A1, A2, B3, and E2 is replaced, the variations in torsion angle are reduced to 0.43°, 0.23°, 0.42°, and 0.31°, respectively, as compared with 0.71°, which is the variation in torsion angle in the case of replacing all the residual stresses ("ALL"). Thus, the areas A1, A2, B3, and E2 are identified as portions that are factors for variation in torsion angle.

From FIG. 43, when the residual stress in each of the areas B3 and E3 is replaced, the variations in amount of bending are reduced to 1.21 mm and 1.30 mm, respectively, as compared with 1.69 mm, which is the variation in amount of bending in the case of replacing all the residual stresses ("ALL"), and relatively larger than the variations in amount of bending in other areas. Thus, the areas B3 and E3 are identified as portions that are factors for variation in amount of bending.

As described above, it is found that even when scattering occurs in the position of the press forming bottom dead center as press forming conditions, portions that are factors for variation in torsion angle and amount of bending as springback amount due to scattering in the position of the press forming bottom dead center can be identified.

INDUSTRIAL APPLICABILITY

According to the present invention, the springback amount variation factor portion identifying method for identifying a portion where scattering in press forming conditions becomes a factor for variation in springback amount can be provided.

REFERENCE SIGNS LIST

1 PRESS FORMED PART
3 TOOL-OF-PRESS-FORMING MODEL
5 DIE
7 PUNCH
9 BLANK
11 TOOL OF PRESS FORMING
21 FIRST PRESS FORMED PART (FIRST PRESS FORMING CONDITION)
23 FIRST PRESS FORMED PART THREE-DIMENSIONAL SHAPE DATA
25 FIRST PRESS FORMED PART MODEL
31 SECOND PRESS FORMED PART (SECOND PRESS FORMING CONDITION)
33 SECOND PRESS FORMED PART THREE-DIMENSIONAL SHAPE DATA
35 SECOND PRESS FORMED PART MODEL
41 TOOL-OF-PRESS-FORMING MODEL
43 DIE
45 PUNCH

The invention claimed is:

1. A method for identifying a variation factor portion of a springback amount, the method identifying a portion in a press formed part that is a factor for variation in a springback amount when variation occurs in the springback amount in the press formed part due to scattering in press forming conditions, and comprising:
    performing press forming analysis under first press forming conditions set in advance, and calculating a residual stress distribution in a press formed part at a press forming bottom dead center;
    performing springback analysis on the press formed part for which the calculated residual stress distribution has been set, and calculating a first springback amount to be caused in the press formed part;
    performing press forming analysis under second press forming conditions set differently from the first press forming conditions within a range of the scattering in press forming conditions, and calculating a residual stress distribution in the press formed part at the press forming bottom dead center;
    replacing a value of residual stress in a partial area of the residual stress distribution in the press formed part calculated under the first press forming conditions with a value of residual stress in an area corresponding to the partial area of the residual stress distribution in the press formed part calculated under the first press forming conditions;
    performing springback analysis on the press formed part for which the value of the residual stress has been replaced, and calculating a second springback amount;
    obtaining a difference between the second springback amount and the first springback amount; and
    identifying a portion in the press formed part that is a factor for variation in springback amount of the press formed part based on the obtained difference.

2. The method for identifying the variation factor portion of the springback amount according to claim 1, wherein the press forming conditions include mechanical properties of a blank material, a thickness and a shape of the blank material, temperature of the blank material, sliding characteristics between the blank material and a tool of press forming, a relative position of the blank material with respect to the tool of press forming, a position and a shape of a positioning device for the blank material, mechanical properties of a material of the tool of press forming, a shape of a surface of the tool of press forming, an internal structure of the tool of press forming, blank holder force, a blank holder position, a position and a shape of a device for applying blank holder force to component parts of the tool of press forming, an initial relative position of the component parts of the tool of press forming, relative speed of movement of the tool of press forming, vibration of the tool of press forming, temperature of the tool of press forming, atmospheric temperature, atmospheric components, a pressurizing device, and electromagnetic environments.

3. A method for identifying a variation factor portion of a springback amount, the method identifying a portion in a press formed part that is a factor for variation in a springback amount when variation occurs in the springback amount in the press formed part due to scattering in press forming conditions, and comprising:

press forming a first press formed part under first press forming conditions in advance;

creating a first press formed part model from three-dimensional shape measurement data obtained by measuring a surface shape of the first press formed part after die release;

performing mechanical analysis in a state in which the first press formed part model is sandwiched by a tool-of-press-forming model until reaching a press forming bottom dead center;

acquiring residual stress distribution in the first press formed part at the press forming bottom dead center under the first press forming conditions;

press forming a second press formed part under second press forming conditions different from the first press forming conditions within a range of the scattering in press forming conditions in advance;

creating a second press formed part model from three-dimensional shape measurement data obtained by measuring a surface shape of the second press formed part after die release;

performing mechanical analysis in a state in which the second press formed part model is sandwiched by the tool-of-press-forming model until reaching the press forming bottom dead center, acquiring residual stress distribution in the second press formed part at the press forming bottom dead center under the second press forming conditions;

performing springback analysis on the first press formed part for which the acquired residual stress distribution in the first press formed part has been set, and calculating a first springback amount;

replacing a value of residual stress in a partial area of the acquired residual stress distribution in the first press formed part with a value of residual stress in an area corresponding to the partial area of the acquired residual stress distribution in the second press formed part;

performing springback analysis on the first press formed part for which the value of the residual stress has been replaced, and calculating a second springback amount;

obtaining a difference between the second springback amount and the first springback amount; and identifying a portion in the first press formed part that is a factor for variation in springback amount of the first press formed part based on the obtained difference.

4. The method for identifying the variation factor portion of the springback amount according to claim 3, wherein the press forming conditions include mechanical properties of a blank material, a thickness and a shape of the blank material, temperature of the blank material, sliding characteristics between the blank material and a tool of press forming, a relative position of the blank material with respect to the tool of press forming, a position and a shape of a positioning device for the blank material, mechanical properties of a material of the tool of press forming, a shape of a surface of the tool of press forming, an internal structure of the tool of press forming, blank holder force, a blank holder position, a position and a shape of a device for applying blank holder force to component parts of the tool of press forming, an initial relative position of the component parts of the tool of press forming, relative speed of movement of the tool of press forming, vibration of the tool of press forming, temperature of the tool of press forming, atmospheric temperature, atmospheric components, a pressurizing device, and electromagnetic environments.

\* \* \* \* \*